United States Patent
Kumeta et al.

(10) Patent No.: US 11,543,152 B2
(45) Date of Patent: Jan. 3, 2023

(54) VENTILATION DUCT LINE ASSEMBLY AND APPARATUS

(71) Applicants: FUJIFILM BUSINESS INNOVATION CORP., Tokyo (JP); FUJIFILM CORPORATION, Tokyo (JP)

(72) Inventors: Koichi Kumeta, Yokohama (JP); Fuyuki Kokubu, Yokohama (JP); Shinya Mitourida, Yokohama (JP); Koh Umenai, Yokohama (JP); Shogo Yamazoe, Ashigarakami-gun (JP); Shinya Hakuta, Ashigarakami-gun (JP); Akihiko Ohtsu, Ashigarakami-gun (JP)

(73) Assignees: FUJIFILM Business Innovation Corp., Tokyo (JP); FUJIFILM CORPORATION, Tokyo (JP)

( * ) Notice: Subject to any disclaimer, the term of this patent is extended or adjusted under 35 U.S.C. 154(b) by 406 days.

(21) Appl. No.: 16/645,841

(22) PCT Filed: Jun. 28, 2018

(86) PCT No.: PCT/JP2018/024710
§ 371 (c)(1),
(2) Date: Mar. 10, 2020

(87) PCT Pub. No.: WO2019/073641
PCT Pub. Date: Apr. 18, 2019

(65) Prior Publication Data
US 2020/0200433 A1 Jun. 25, 2020

(30) Foreign Application Priority Data

Oct. 12, 2017 (JP) .............................. JP2017-198579

(51) Int. Cl.
*F24F 13/24* (2006.01)
*G10K 11/172* (2006.01)

(52) U.S. Cl.
CPC ............ *F24F 13/24* (2013.01); *G10K 11/172* (2013.01); *F24F 2013/245* (2013.01)

(58) Field of Classification Search
CPC ... G10K 11/172; F24F 2013/245; F24F 13/24
(Continued)

(56) References Cited

U.S. PATENT DOCUMENTS 9,402,333 B2 * 7/2016 Li ...................... H05K 7/20136
9,541,301 B2 * 1/2017 Jung .................. B60H 1/00571
(Continued)

FOREIGN PATENT DOCUMENTS

EP 0 265 000 A1 4/1988
JP S55-064040 U 5/1980
(Continued)

OTHER PUBLICATIONS

Sep. 14, 2021 Notice of Reasons for Refusal issued in Japanese Patent Application No. 2017-198579.
(Continued)

*Primary Examiner* — Forrest M Phillips
(74) *Attorney, Agent, or Firm* — Oliff PLC

(57) ABSTRACT

A first ventilation duct line has a first portion having a first sectional area, a second portion having a second sectional area larger than the first sectional area, and a third portion having an inclined inner face connecting the first portion and the second portion to each other. Further, there is a second ventilation duct line having an opening portion positioned on an inner side of the first portion of the first ventilation duct line.

21 Claims, 14 Drawing Sheets

(58) Field of Classification Search
USPC .......................................................... 181/224
See application file for complete search history.

(56) References Cited

U.S. PATENT DOCUMENTS

| | | | |
|---|---|---|---|
| 9,574,791 B2* | 2/2017 | Lind | F24F 13/24 |
| 9,605,631 B2* | 3/2017 | Zirkelbach | F02M 35/1216 |
| 11,114,080 B2* | 9/2021 | Lee | G10K 11/162 |
| 11,322,126 B2* | 5/2022 | Lee | G10K 11/162 |
| 2008/0053749 A1* | 3/2008 | Utsunomiya | G03B 21/16 |
| | | | 181/284 |
| 2017/0053633 A1 | 2/2017 | Ishida et al. | |
| 2018/0197522 A1 | 7/2018 | Ishida et al. | |
| 2019/0272811 A1 | 9/2019 | Ishida et al. | |

FOREIGN PATENT DOCUMENTS

| | | |
|---|---|---|
| JP | H01-296040 A | 11/1989 |
| JP | H10-198385 A | 7/1998 |
| JP | H11-201815 A | 7/1999 |
| JP | 2016-033649 A | 3/2016 |

OTHER PUBLICATIONS

Sep. 18, 2018 Search Report issued in International Patent Application No. PCT/JP2018/024710.
Sep. 18, 2018 Written Opinion of the International Searching Authority issued in International Patent Application No. PCT/JP2018/024710.

* cited by examiner

FRONT ←——→ REAR

VENTILATION DUCT LINE ASSEMBLY AND APPARATUS

TECHNICAL FIELD

The present invention relates to a ventilation duct line assembly and an apparatus.

BACKGROUND ART

A sound absorbing apparatus has been disclosed in PTL 1. The sound absorbing apparatus has a configuration in which frequencies of sound whose volume can be reduced by provision of at least one of sound absorbing portions and frequencies of sound whose volume can be increased by provision of another one of the sound absorbing portions overlap each other at least partially.

PRIOR ART DOCUMENT

Patent Literature

PTL 1: JP-A-2016-33649

SUMMARY OF INVENTION

Problem to be Solved by the Invention

When a structure for reducing sound is placed in a ventilation duct line assembly without considering the shape of the ventilation duct line assembly, the structure may be placed at a place where the degree of reduction of sound is reduced. In this case, the sound emitted from the ventilation duct line assembly increases.

At least one embodiment of the present invention can increase the degree of reduction of sound in a ventilation duct line assembly when a structure for reducing sound is placed in the ventilation duct line assembly, in comparison with a case where the structure is placed without considering the shape of the ventilation duct line assembly.

Means for Solving the Problem

A first aspect of the invention is a ventilation duct line assembly comprising: a first ventilation duct line through which sound can pass between at least two openings, and that has a first portion having a first sectional area, a second portion having a second sectional area larger than the first sectional area, and a third portion having an inclined inner face connecting the first portion and the second portion to each other; and a second ventilation duct line that has an opening portion positioned on an inner side of the first portion of the first ventilation duct line so that sound received from the opening portion is reflected inside the second ventilation duct line and then emitted from the opening portion.

A second aspect of the invention is the ventilation duct line assembly of the first aspect, wherein the opening portion of the second ventilation duct line is shaped to be a rectangle or an ellipse, and a longitudinal direction of the opening portion intersects with a direction in which the first ventilation duct line extends.

A third aspect of the invention is the ventilation duct line assembly of the first aspect of the second aspect, wherein the second ventilation duct line is disposed at an inner side of the first ventilation duct line.

A fourth aspect of the invention is the ventilation duct line assembly of the third aspect, wherein at least a portion of an outer face of the second ventilation duct line is bonded to a portion of an inner face of the first ventilation duct line.

A fifth aspect of the invention is the ventilation duct line assembly of the fourth aspect, wherein a distance between an opposed face of the second ventilation duct line on an opposite side to the bonding face of the second ventilation duct line and an inner face of the first ventilation duct line is shorter than a longitudinal-direction length of the bonding face of the second ventilation duct line.

A sixth aspect of the invention is the ventilation duct line assembly of the fourth aspect or the fifth aspect, wherein: the first portion of the first ventilation duct line has a width in a direction intersecting with a direction in which the first ventilation duct line extends; and the second ventilation duct line is provided to extend from one end of the first portion to the other end of the first portion in the width direction, and in the opening portion of the second ventilation duct line, a longitudinal-direction length of the opening portion is a length which is 90% or more of a width-direction distance between the one end of the first portion and the other end of the first portion.

A seventh aspect of the invention is the ventilation duct line assembly of any one of the first aspect to the sixth aspect, wherein: a box having an opening portion is placed at an inner side of the first ventilation duct line; and the second ventilation duct line is formed by an internal space of the box.

An eighth aspect of the invention is the ventilation duct line assembly of the seventh aspect, wherein the box is formed into a shape of a rectangular parallelepiped.

A ninth aspect of the invention is the ventilation duct line assembly of the eighth aspect, wherein: the box having the shape of the rectangular parallelepiped has three pairs of outer faces which are opposed to each other; a first face of the box, which is one of one pair of the outer faces each having a largest area, of the three pairs of the outer faces, has the opening portion; and a second face of the box opposed to the first face of the box is bonded to the inner face of the first ventilation duct line.

A tenth aspect of the invention is the ventilation duct line assembly of any one of the first aspect to the ninth aspect, wherein: a portion of the inner face of the first ventilation duct line is formed to be opposed to an air intake port of the first ventilation duct line; and an air outtake port side of the first ventilation duct line continuous to the portion of the inner face of the first ventilation duct line opposed to the air intake port is formed to be opposed to the opening portion of the second ventilation duct line.

An eleventh aspect of the invention is the ventilation duct line assembly of any one of the first aspect to the tenth aspect, wherein an air outtake port of the first ventilation duct line is formed to face down in a vertical direction.

A twelfth aspect of the invention is the ventilation duct line assembly of any one of the first aspect to the eleventh aspect, wherein an area of an air outtake port belonging to the first ventilation duct line is larger than the sectional area of the first portion.

A thirteenth aspect of the invention is the ventilation duct line assembly of any one of the first aspect to the twelfth aspect, wherein the first portion of the first ventilation duct line is formed so that the first sectional area in the sectional area of the first ventilation duct line is smallest.

A fourteenth aspect of the invention is a ventilation duct line assembly comprising: a first ventilation duct line through which sound can pass between at least two openings, and that has a first portion having a first sectional area, an outtake port that is one of the at least two openings and serves for discharging air, and whose area is larger than the first sectional area, and a second portion having an inclined inner face connecting the first portion and the outtake port to each other; and a second ventilation duct line that has an opening portion positioned on an inner side of the first portion of the first ventilation duct line so that sound received from the opening portion is reflected inside the second ventilation duct line and then emitted from the opening portion.

A fifteenth aspect of the invention is the ventilation duct line assembly of any one of the first aspect to the fourteenth aspect, wherein: the second ventilation duct line has a resonance frequency fr [Hz]; and at a frequency fma [Hz] highest among frequencies at each of which transmission loss is minimum about a transmission loss spectrum of the first ventilation duct line and that are lower than the resonance frequency fr, the second ventilation duct line satisfies the following expression (2)

$$0 \leq La1 \leq \lambda fma/4 \quad (2)$$

where La1 designates a distance between the opening portion of the second ventilation duct line and a position of the first ventilation duct line at which sound pressure is maximum and that is nearest to the opening portion with respect to the same direction as a flowing direction of the sound at the frequency fma, and $\lambda$fma designates a wavelength at the frequency fma.

A sixteenth aspect of the invention is the ventilation duct line assembly of any one of the first aspect to the fourteenth aspect, wherein: the second ventilation duct line has a resonance frequency fr [Hz]; and at a frequency fmb [Hz] lowest among frequencies at each of which transmission loss is minimum about a transmission loss spectrum of the first ventilation duct line and that are higher than the resonance frequency fr, the second ventilation duct line satisfies the following expression (4)

$$\lambda fmb/4 \leq La2 \leq \lambda fmb/2 \quad (4)$$

where La2 designates a distance between the opening portion of the second ventilation duct line and a position of the first ventilation duct line at which sound pressure is maximum and that is nearest to the opening portion with respect to the same direction as a flowing direction of the sound at the frequency fmb, and $\lambda$fmb designates a wavelength at the frequency fmb.

A seventeenth aspect of the invention is the ventilation duct line assembly of any one of the first aspect to the sixteenth aspect, wherein a porous material is placed on an inner face of the second portion and/or the third portion.

An eighteenth aspect of the invention is an apparatus comprising: a sound source; and a fourth partial ventilation duct line through which sound from the sound source can be passed, wherein the fourth partial ventilation duct line is connected to the ventilation duct line assembly according to any one of the first aspect to the seventeenth aspect.

Effect of the Invention

According to the first aspect of the invention, it is possible to increase the degree of reduction of sound in the ventilation duct line assembly when a structure for reducing sound is placed in the ventilation duct line assembly, in comparison with a case where the structure is placed without considering the shape of the ventilation duct line assembly.

According to the second aspect of the invention, it is possible to increase the degree of reduction of sound in the ventilation duct line assembly, in comparison with a case where the longitudinal direction of the opening portion of the second ventilation duct line extends along the direction in which the first ventilation duct line extends.

According to the third aspect of the invention, it is possible to prevent the second ventilation duct line from protruding radially outward from the first ventilation duct line.

According to the fourth aspect of the invention, it is possible to make a gas flow in the first ventilation duct line smoother, in comparison with a case where the outer face of the second ventilation duct line is not bonded to a portion of the inner face of the first ventilation duct line.

According to the fifth aspect of the invention, it is possible to make a gas flow in the first ventilation duct line smoother, in comparison with a case where the distance between the opposed face of the second ventilation duct line and the inner face of the first ventilation duct line is longer than the longitudinal-direction length of the bonding face of the second ventilation duct line.

According to the sixth aspect of the invention, it is possible to increase the degree of reduction of sound in the ventilation duct line assembly, in comparison with a case where the second ventilation duct line is provided at a width-direction partial region of the first portion.

According to the seventh aspect of the invention, the box is placed at an inner side of the first ventilation duct line so that it is possible to reduce sound emitted from the first ventilation duct line.

According to the eighth aspect of the invention, it is easier to mold the box during manufacturing, in comparison with a case where the box is formed into any other shape than the rectangular parallelepiped.

According to the ninth aspect of the invention, it is possible to make a gas flow in the first ventilation duct line smoother, in comparison with a case where the outer face included in the one pair of the outer faces each having the largest area, of the three pairs of the outer faces is not bonded to the inner face of the first ventilation duct line.

According to the tenth aspect of the invention, it is possible to reduce resistance against the gas flowing through the first ventilation duct line, in comparison with a case where the opening portion of the second ventilation duct line is positioned on, of the inner face of the first ventilation duct line, an inner face side opposed to the air intake port.

According to the eleventh aspect of the invention, sound leaking from the air outtake port travels toward the ground or the floor so that it is possible to reduce the sound in the vicinity of the air outtake port, in comparison with a case where the air outtake port faces up in the vertical direction.

According to the twelfth aspect of the invention, it is possible to reduce resistance of a flow channel of the first ventilation duct line, in comparison with a case where the area of the air outtake port of the first ventilation duct line is smaller than the sectional area of the first portion.

According to the thirteenth aspect of the invention, it is easier to collect sound in the opening portion of the second ventilation duct line, in comparison with a case where the size of the first sectional area is not smallest in the sectional area of the first ventilation duct line.

According to the fourteenth aspect of the invention, it is possible to increase the degree of reduction of sound in the ventilation duct line assembly when a structure for reducing sound is placed in the ventilation duct line assembly, in comparison with a case where the structure is placed without considering the shape of the ventilation duct line assembly.

According to the fifteenth aspect of the invention, it is possible to increase the degree of reduction of sound in the ventilation duct line assembly, in comparison with a case where the relation of $0 \le La1 \le \lambda fma/4$ is not satisfied.

According to the sixteenth aspect of the invention, it is possible to increase the degree of reduction of sound in the ventilation duct line assembly, in comparison with a case where the relation of $\lambda fmb/4 \le La2 \le \lambda fmb/2$ is not satisfied.

According to the seventeenth aspect of the invention, it is possible to increase the degree of reduction of sound in the ventilation duct line assembly, in comparison with a case where the porous material is not placed on the inner face of the second portion and/or the third portion.

According to the eighteenth aspect of the invention, it is possible to increase the degree of reduction of sound in the apparatus including the ventilation duct line assembly when a structure for reducing sound is placed in the ventilation duct line assembly, in comparison with a case where the structure is placed without considering the shape of the ventilation duct line assembly.

EMBODIMENTS FOR CARRYING OUT THE INVENTION

An embodiment of the present invention will be described below with reference to the accompanying drawings.

Figure 1:
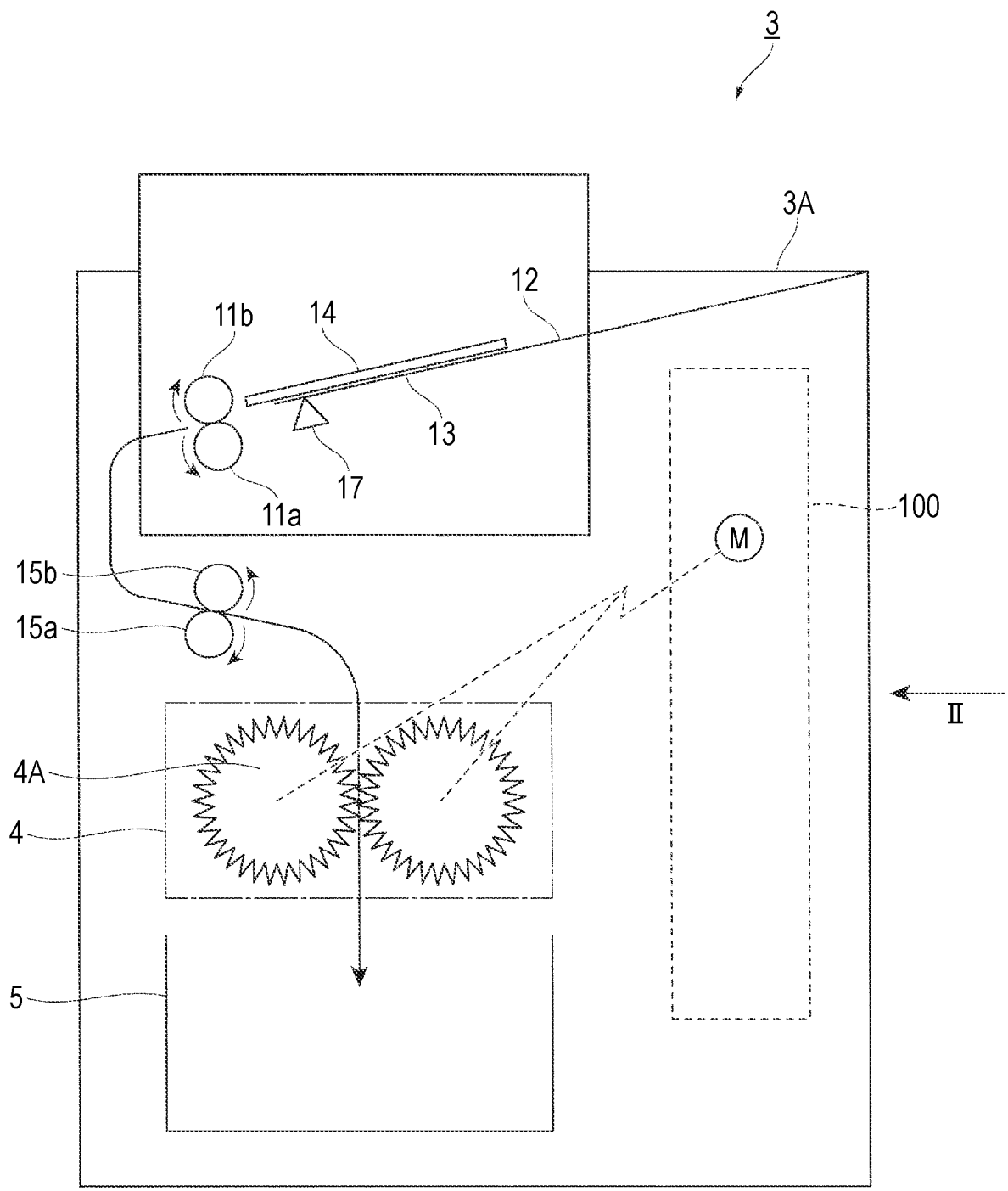
FIG. 1 is a view showing the configuration of a waste disposal treatment apparatus.

FIG. 1 is a view showing the configuration of a waste disposal treatment apparatus.

An apparatus body 3A is provided in the waste disposal treatment apparatus 3. Further, a medium loading portion 13 on which a paper medium 14 to be disposed of can be loaded is provided in an upper portion of the apparatus body 3A.

Incidentally, a case where the paper medium 14 on the medium loading portion 13 is treated will be described by way of example in the present embodiment. However, the waste disposal treatment apparatus 3 according to the present embodiment may perform waste disposal treatment not only on the paper medium 14 but also on another kind of recording medium such as a DVD (Digital Versatile Disc) or a CD (Compact Disc).

A sensor 17 for detecting the paper medium 14 on the medium loading portion 13 is provided inside the apparatus body 3A. Further, a waste disposal treatment portion 4 for performing waste disposal treatment on the paper medium 14 is provided under the medium loading portion 13. Further, a collection container 5 for collecting a waste generated by the waste disposal treatment portion 4 is provided under the waste disposal treatment portion 4.

The waste disposal treatment portion 4 performs treatment on the paper medium 14 so that the paper medium 14 cannot be reused. Specifically, the waste disposal treatment portion 4 cuts the paper medium 14 by use of rotatory blades 4A rotated by a motor M, so as to perform treatment on the paper medium 14.

Further, delivery rolls 11a and 11b for delivering the paper medium 14 on the medium loading portion 13 are provided in the waste disposal treatment apparatus 3. Further, conveyance rolls 15a and 15b for conveying the paper medium 14 delivered by the delivery rolls 11a and 11b to the waste disposal treatment portion 4 are provided in the waste disposal treatment apparatus 3.

Further, a ventilation duct line assembly 100 for sending air inside the apparatus body 3A to the outside of the apparatus body 3A is provided on a rear side of the apparatus body 3A in the waste disposal treatment apparatus 3.

Incidentally, a case where air (an example of gas) flows through the ventilation duct line assembly 100 will be described in the present embodiment. However, any other gas than the air may be made to flow into the ventilation duct line assembly 100.

Figure 2:
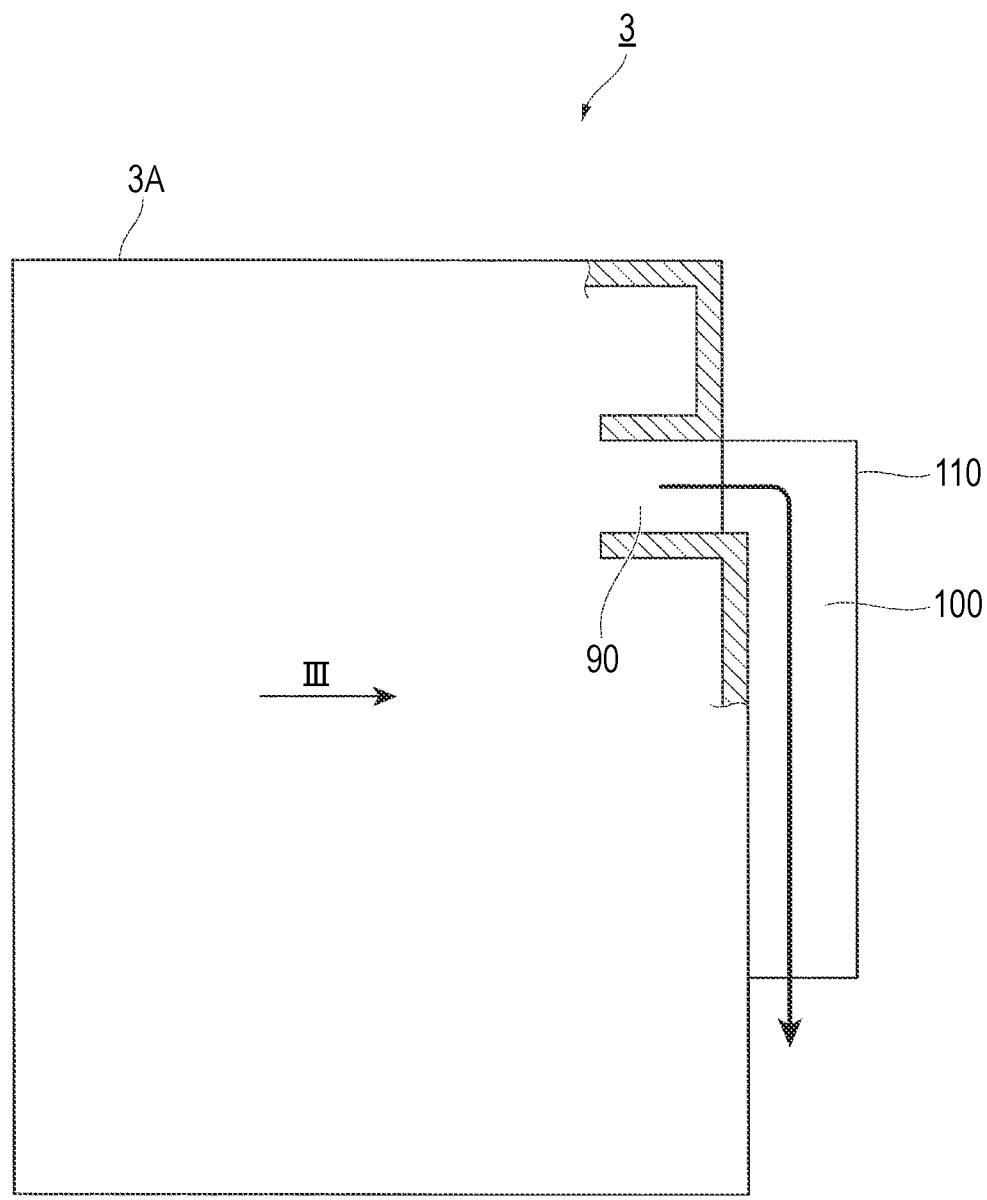
FIG. 2 is a view of the waste disposal treatment apparatus when seen from a direction of an arrow II of FIG. 1.

FIG. 2 is a view of the waste disposal treatment apparatus 3 when seen from a direction of an arrow II of FIG. 1.

In the waste disposal treatment apparatus 3 according to the present embodiment, the ventilation duct line assembly 100 is provided on the rear side of the apparatus body 3A, as described above. More specifically, in the present embodiment, a tubular member (an air outtake duct) 110 is attached to the rear side of the apparatus body 3A. The inside of the tubular member 110 serves as the ventilation duct line assembly 100.

Further, in the present embodiment, an intra-body ventilation duct line 90 (an example of a fourth partial ventilation duct line) which is a partial ventilation duct line is provided inside the apparatus body 3A. The intra-body ventilation duct line 90 is connected to the ventilation duct line assembly 100.

In the present embodiment, air is discharged sequentially from the inside of the waste disposal treatment apparatus 3 to the outside by a not-shown fan. On this occasion, the air passes through the intra-body ventilation duct line 90 and the ventilation duct line assembly 100.

In the present embodiment, the air discharged from the waste disposal treatment apparatus 3 passes through the ventilation duct line assembly 100 so that suspended matter contained in the air can be removed. In addition, since the air passes through the ventilation duct line assembly 100, sound (noise) emitted from the waste disposal treatment apparatus 3 is reduced (details will be described later).

Incidentally, a case where sound occurring in the waste disposal treatment apparatus 3 (sound occurring in the motor M etc. witch is a sound source) is deadened by use of the ventilation duct line assembly 100 will be described by way of example in the present embodiment. However, the sound deadened by the ventilation duct line assembly 100 is not limited particularly.

When the ventilation duct line assembly 100 according to the present embodiment is used, noise (with frequencies 500 to 3000 Hz) can be deadened. In addition, sound which occurs not intentionally but naturally can be deadened. Specifically, for example, motor sound, friction sound of a moving component, collision sound, or the like, can be deadened.

In addition, the term "deaden" in the description of the present invention includes not only a concept of silencing the sound but also a concept of reducing the sound.

Figure 3A:
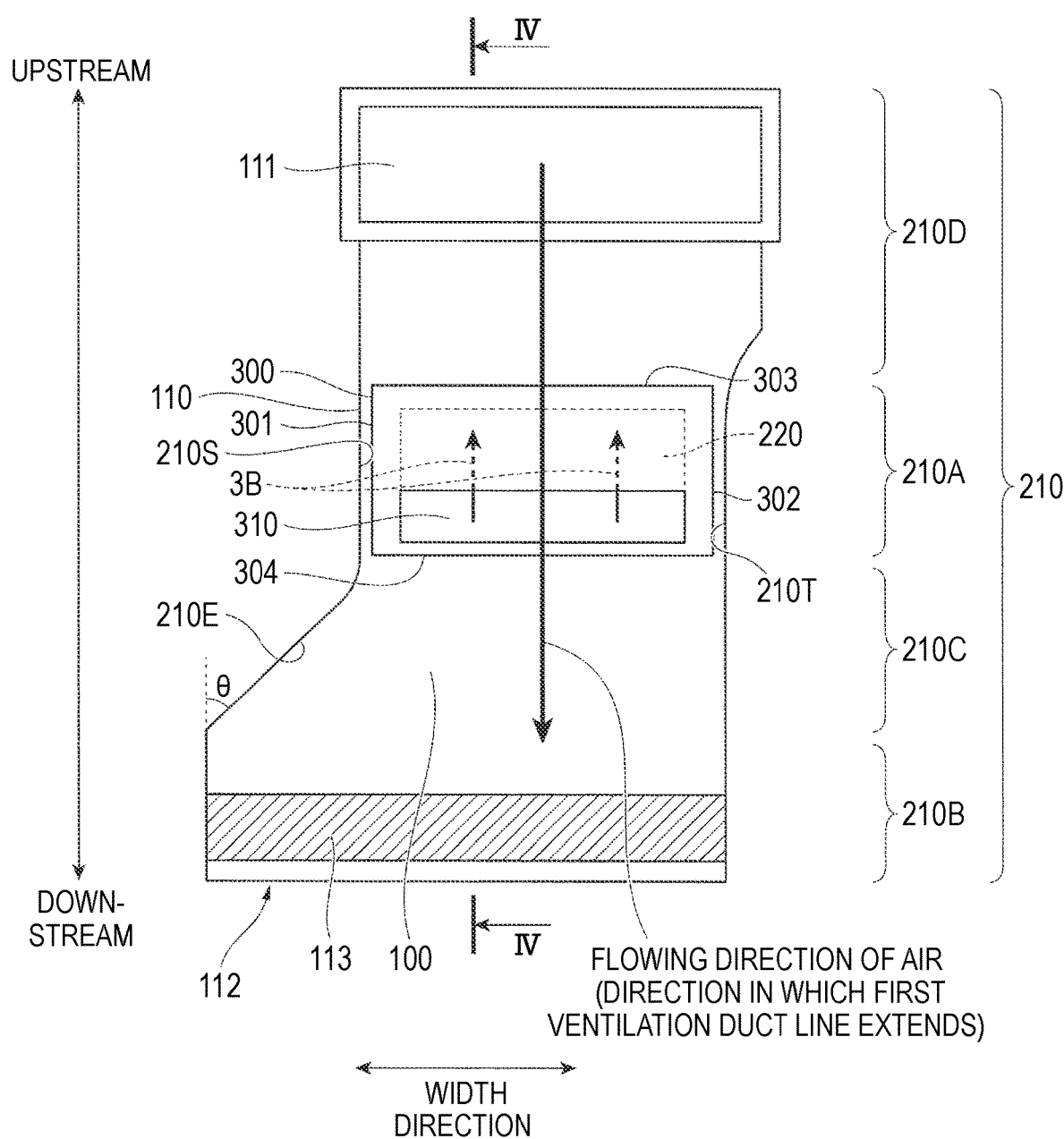
FIG. 3A is a view of the inside of a tubular member when seen from a direction indicated by an arrow III of FIG. 2.

FIG. 3A is a view of the inside of the tubular member 110 when seen from a direction indicated by an arrow III of FIG. 2.

In the present embodiment, the inside of the tubular member 110 serves as the ventilation duct line assembly 100, as described above. The ventilation duct line assembly 100 is constituted by a first ventilation duct line 210 and a second ventilation duct line 220.

The first ventilation duct line 210 is formed to extend from an air intake port 111 to an air outtake port 112. The air intake port 111 is positioned in an upper end portion of the tubular member 110. The air outtake port 112 is positioned in a lower end portion of the tubular member 110.

A rectangular parallelepiped box 300 having an opening portion 310 is placed inside the first ventilation duct line 210. In the present embodiment, an internal space of the box 300 serves as the second ventilation duct line 220. The second ventilation duct line 220 is disposed to extend along a flowing direction of the air in the first ventilation duct line 210.

The second ventilation duct line 220 is constituted thus by the box 300, and the box 300 is shaped to be a rectangular parallelepiped. In this manner, the box 300 can be manufactured easily and the second ventilation duct line 220 can be placed easily.

A filter 113 is placed in the air outtake port 112. In the present embodiment, odor or suspended matter such as dust or paper powder contained in the air discharged from the waste disposal treatment apparatus 3 is removed by the filter 113.

The first ventilation duct line 210 is disposed so as to extend along an up/down direction. At the same time, the first ventilation duct line 210 is disposed so that the air outtake port 112 faces down in a vertical direction.

The expression "face down in the vertical direction" means a state in which the direction the air outtake port 112 faces is smaller than 45° with respect to the vertical direction. Incidentally, the angle with respect to the vertical direction is preferably within 10°. In this case, the air outtake port 112 is in a state to face substantially straight down.

When the air outtake port 112 is disposed to face down in the vertical direction, sound leaking from the air outtake port 112 easily travels toward the ground or the floor, so that the sound in the vicinity of the air outtake port 112 hardly becomes large.

The box 300 has the opening portion 310. Sound enters the box 300 through the opening portion 310. The sound entering the box 300 moves in a direction away from the opening portion 310 as indicated by an arrow 3B in FIG. 3A, and is reflected inside the box 300 to move toward the opening portion 310 again. Then, the sound leaves through the opening portion 310.

In the present embodiment, a duct coupling mode is formed by the first ventilation duct line 210 and the second ventilation duct line 220, as will be described later. Thus, the sound is confined in the first ventilation duct line 210 so that the sound emitted from the first ventilation duct line 210 through the air outtake port 112 is reduced.

As shown in FIG. 3A, the first ventilation duct line 210 is provided with a first portion 210A and a second portion 210B. The sectional area of the first portion 210A is small. The sectional area of the second portion 210B is larger than that of the first portion 210A.

In other words, the first ventilation duct line 210 is provided with the first portion 210A which has a first sectional area, and the second portion 210B which has a second sectional area larger than the first sectional area.

The aforementioned expression "sectional area" in the first ventilation duct line 210 means a sectional area in a face perpendicularly intersecting with the flowing direction of the air in the first ventilation duct line 210.

Incidentally, it is also assumed that the flowing direction of the air varies from place to place inside the first ventilation duct line 210 according to the shape of the first ventilation duct line 210. In this case, a main direction of the airflow in which a flow rate of the air is highest is set as the flowing direction of the air.

Here, the flowing direction of the air inside the first ventilation duct line 210 is confirmed, for example, by a plurality of small-sized sensors disposed three-dimensionally inside the first ventilation duct line 210. The flowing direction of the air at a place where the flow rate is highest is set as the flowing direction of the air in the first ventilation duct line 210.

Incidentally, in the present embodiment, the flowing direction of the air inside the first ventilation duct line 210 and a direction (axial direction) in which the first ventilation duct line 210 extends are roughly consistent with each other. The aforementioned expression "sectional area" can be expressed as a sectional area in a face perpendicularly intersecting with the direction in which the first ventilation duct line 210 extends.

In the present embodiment, as shown in FIG. 3A, the first ventilation duct line 210 is further provided with a third portion 210C which connects the first portion 210A and the second portion 210B to each other.

The third portion 210C has an inner face 210E which is inclined with respect to the axial direction of the first ventilation duct line 210 (the flowing direction of the air flowing through the first ventilation duct line 210). More specifically, the third portion 210C has the inner face 210E in which the width of the third portion 210C is made larger toward a downstream side in the flowing direction of the air.

Incidentally, an inclination angle θ of the inner face 210E with respect to the axial direction of the first ventilation duct line 210 (the flowing direction of the air flowing through the first ventilation duct line 210) is preferably set to be not larger than 60°.

Figure 3B:
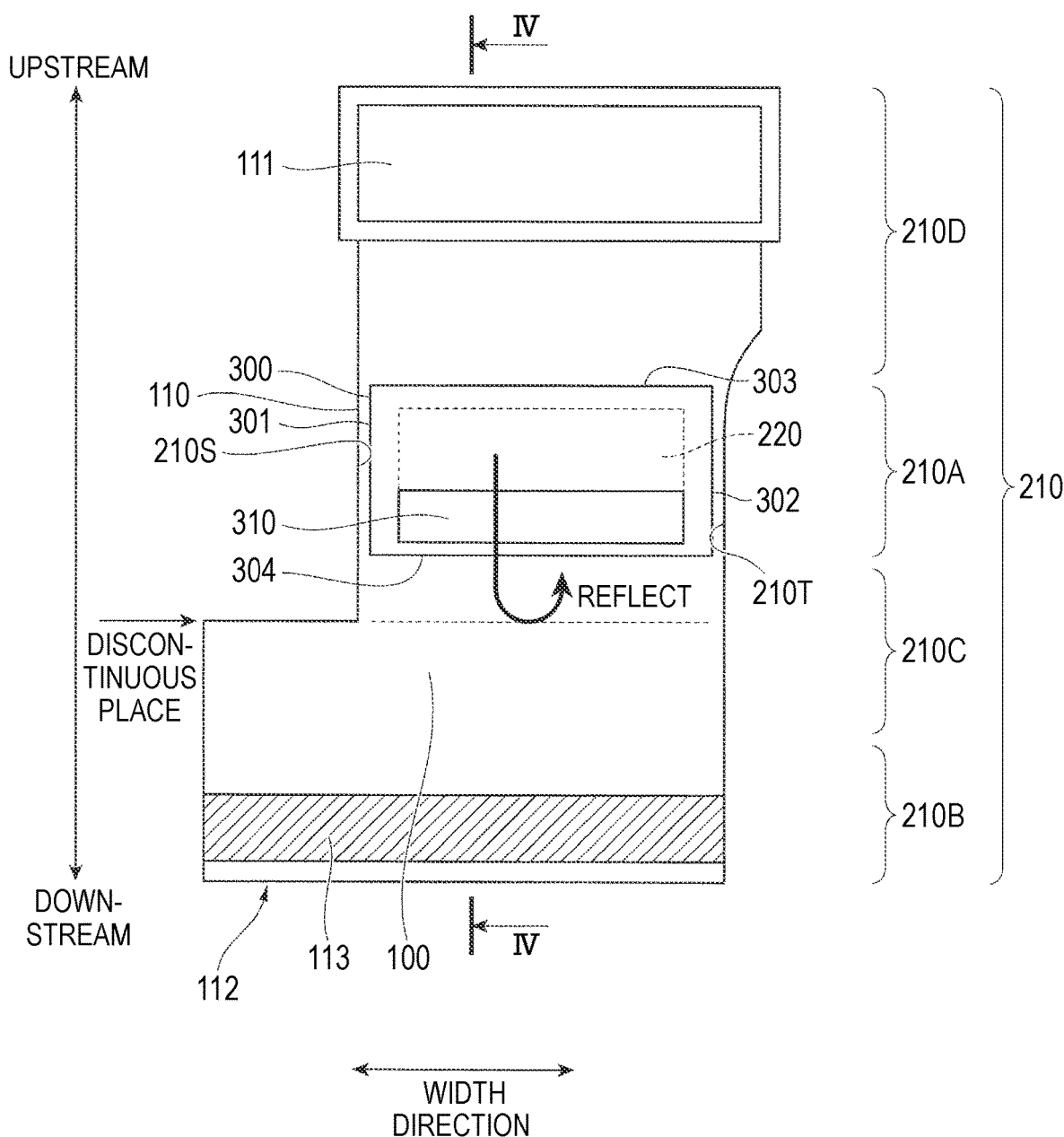
FIG. 3B is a view showing another configuration example of the ventilation duct line assembly.

Here, when the inclined inner face 210E is not provided so that the sectional area (section) of the first ventilation duct line 210 changes discontinuously, as shown in FIG. 3B (a view showing another configuration example of the ventilation duct line assembly 100), acoustic impedance is discontinuous at a place where the sectional area of the first ventilation duct line 210 changes discontinuously. Accordingly, reflection of a sound wave occurs at the place where the sectional area changes discontinuously. Additionally, the discontinuous change in the sectional area of the first ventilation duct line 210 forms a system in which the reflection of the sound wave is enhanced at two places, i.e. at the air outtake port 112 connected to the outside and at the place where the sectional area is discontinuous.

In this case, in which the number of reflection places is two, each antinode and each node of the reflection are often complicated to make a difference in sound pressure between the antinode and the node smaller than that in a case of a system having a single reflection place.

On the other hand, when the inclined inner face 210E is provided so that the sectional area of the first ventilation duct line 210 changes gradually (when the inner face 210E of the first ventilation duct line 210 is a continuously changing face), as in the present embodiment, impedance is suppressed from changing suddenly (the acoustic impedance changes continuously). In this case, reflection of a sound wave hardly occurs in the continuously changing face (the reflection of the sound wave at the place where the inclined inner face 210E is provided), and the place where the reflection of the sound wave is larger is only the air outtake port 112 connected to the outside. In this case, the antinode and the node appear clearly.

In addition, when the sectional area of the first ventilation duct line 210 changes discontinuously, for example, a vortex occurs at the place where the sectional area is discontinuous so that there is also a fear of making the air difficult to flow smoothly. On the other hand, when the sectional area of the first ventilation duct line 210 changes continuously as in the present embodiment, occurrence of a vortex is suppressed so that the air flows more smoothly.

In addition, in the present embodiment, the first portion 210A is positioned on a side nearer to the air intake portion 111 than the second portion 210B, and the second portion 210B is positioned on a side nearer to the air outtake port 112 than the first portion 210A.

In addition, the sectional area of the first portion 210A is smaller than the area of the air outtake port 112. In other words, the area of the air outtake port 112 is larger than the sectional area of the first portion 210A in the present embodiment.

Further, an upstream side portion 210D whose sectional area is larger than the first portion 210A is provided nearer to the air intake portion 111 than the first portion 210A.

In the present embodiment, the sectional area of the place where the first portion 210A is provided in the first ventilation duct line 210 is smallest in the sectional area of the first ventilation duct line 210.

In the present embodiment, since the first portion 210A whose sectional area is small is formed in the first ventilation duct line 210 and the second ventilation duct line 220 is provided in the first portion 210A, a large amount of the sound is collected by the opening portion 310 of the second ventilation duct line 220. Accordingly, sound collection performance in the opening portion 310 is improved.

In addition, in the case where the first portion 210A whose sectional area is small is formed, and the box 300 (the second ventilation duct line 220) is placed in the first portion 210A, as in the present embodiment, the size of the box 300 can be made smaller than in a case where the box 300 is placed in a portion whose sectional area is large.

Further, in the present embodiment, the sectional area of the first portion 210A is smallest, and the opening portion 310 of the second ventilation duct line 220 is positioned in the first portion 210A whose sectional area is smallest. Thus, the sound collection performance in the opening portion 310 can be more increased than in a case where the opening portion 310 is positioned at a place whose sectional area is not smallest.

On the other hand, in the second portion 210B or the third portion 210C whose sectional area is large, a space can be attained broadly so that various members can be placed easily in the space.

For example, in the second portion 210B or the third portion 210C, a porous sound-absorbing member which is made of urethane, or the like, can be disposed over a wide area. Thus, a sound absorption effect can be increased.

In addition, in the present embodiment, the air outtake port 112 is large so that even an odor removal filter whose area is large can be placed. Thus, deodorization performance for removing odor contained in the air can be improved.

In addition, in the third portion 210C, the inner face of the first ventilation duct line 210 is inclined (the inclined inner face 210E is provided) so that the sound reflected by a gap between the first portion 210A and the second portion 210B is decreased.

Incidentally, a body portion (the other place than the opening portion 310) of the box 300 may be positioned outside the first portion 210A.

Specifically, for example, the body portion of the box 300 may be located on the third portion 210C side. More specifically, in FIG. 3A, the box 300 extends in an illustrated upper direction from the opening portion 310. However, the box 300 may be placed so that the box 300 extends in an illustrated lower direction from the opening portion 310.

In addition, one box 300 is provided in the present embodiment. However, when a plurality of kinds of sounds different in frequency from one another enter the first ventilation duct line 210, a plurality of boxes 300 (a plurality of second ventilation duct lines 220) may be placed correspondingly to the frequencies respectively.

Incidentally, the full length of the box 300 (the full length of the first ventilation duct line 210 in the flowing direction of the air, the full length of the first ventilation duct line 210 in the direction in which the first ventilation duct line 210 extends) varies according to a frequency of sound which is intended to be deadened. When the plurality of boxes 300 are placed correspondingly to the frequencies respectively, the plurality of boxes 300 having different full lengths from one another are placed.

In the present embodiment, sound from the apparatus body 3A (see FIG. 1) passes through the first ventilation duct line 210. When the sound passes through the first ventilation duct line 210, the sound is deadened.

In addition, in the present embodiment, air from the apparatus body 3A passes through the second portion 210B.

The filter 113 is provided in the second portion 210B. Suspended matter (powder) or odor contained in the air is removed by the filter 113.

Here, the sectional area of the second portion 210B is larger than the sectional area of the first portion 210A. The flow rate of the air in the second portion 210B is lower than that in the first portion 210A. Thus, the suspended matter or the odor can be removed more effectively by the filter 113 than that in a case where the flow rate of the air is higher.

Figure 4:
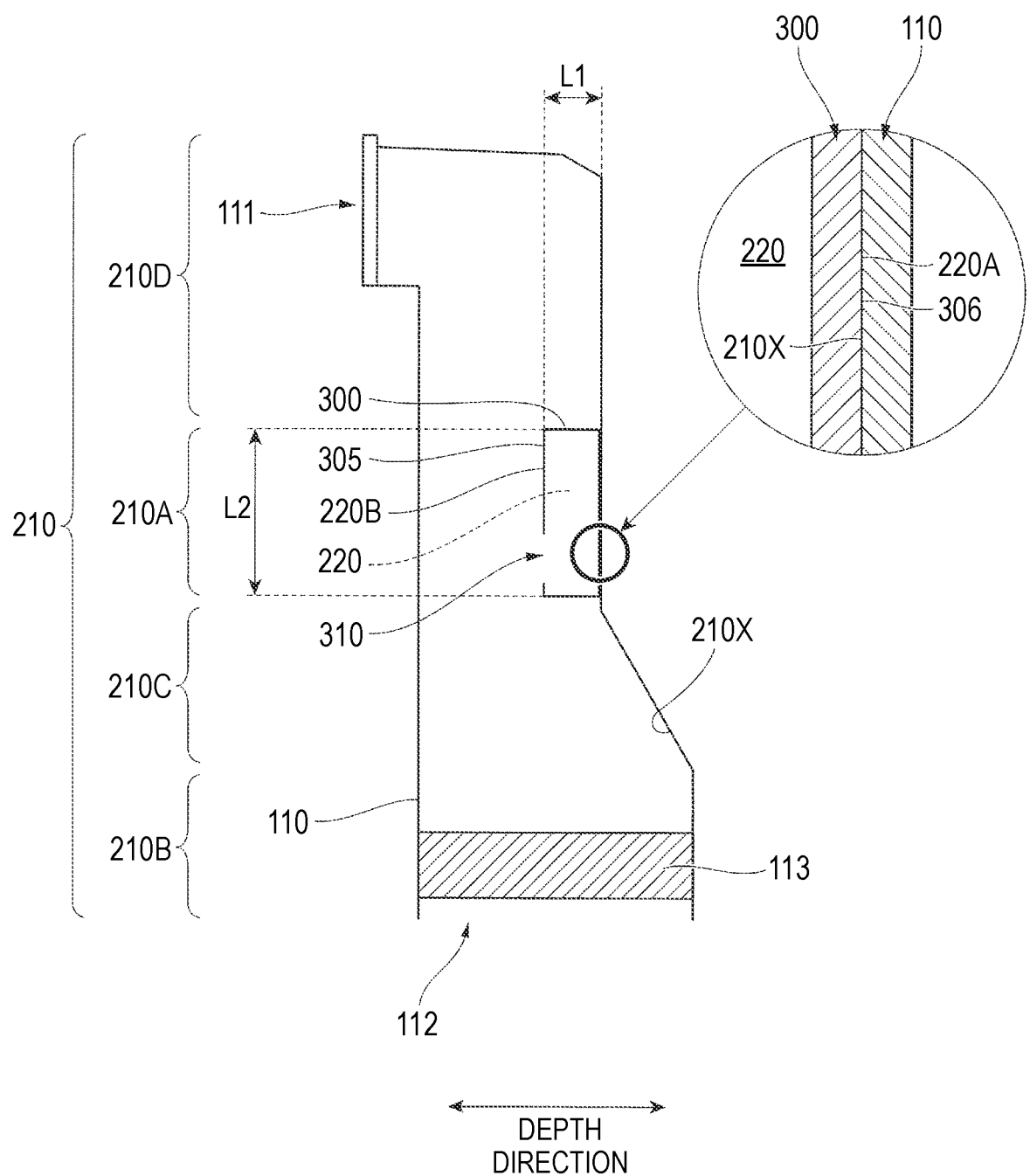
FIG. 4 is a sectional view of a first ventilation duct line and a second ventilation duct line taken along a line IV-IV of FIG. 3A.

FIG. 4 is a sectional view of the first ventilation duct line 210 and the second ventilation duct line 220 taken along a line IV-IV of FIG. 3A.

In the present embodiment, the width of the first ventilation duct line 210 is partially enlarged also in a depth direction of the waste disposal treatment apparatus 3. Specifically, the width of the first ventilation duct line 210 is enlarged in the second portion 210B and the third portion 210C.

In addition, as shown in FIG. 4, the box 300 (the second ventilation duct line 220) is disposed on an inner side of the first ventilation duct line 210. Thus, the second ventilation duct line 220 can be restrained from protruding from an outer circumferential face of the tubular member 110.

Here, the second ventilation duct line 220 is not limited to the inside of the first ventilation duct line 210 but may be disposed outside the first ventilation duct line 210.

More specifically, a body portion (the other portion than the opening portion 310) of the second ventilation duct line 220 may be provided outside the first ventilation duct line 210 (outside the outer circumferential face of the tubular member 110).

Further, in the present embodiment, as shown in FIG. 4, the box 300 is fixed to an inner face 210X of the first ventilation duct line 210. In other words, a portion of an outer face of the box 300 is bonded to a portion of the inner face 210X of the first ventilation duct line 210. Additionally, in the present embodiment, at least a portion of an outer face of the second ventilation duct line 220 is bonded to a portion of the inner face 210X of the first ventilation duct line 210.

When the outer face of the second ventilation duct line 220 is configured thus to be bonded to the inner face 210X of the first ventilation duct line 210, the second ventilation duct line 220 is made closer to the inner face 210X of the first ventilation duct line 210 so that the airflow in the first ventilation duct line 210 can be made smoother (resistance of the flow channel in the first ventilation duct line 210 is reduced).

The second ventilation duct line 220 is provided with a bonding face 220A bonded to the inner face 210X of the first ventilation duct line 210. Further, the second ventilation duct line 220 is provided with a ventilation duct line opposing face 220B on an opposite side to the bonding face 220A.

Further, as shown in FIG. 4, the box 300 is provided to extend along the inner face 210X of the first ventilation duct line 210. In other words, the second ventilation duct line 220 is provided to extend along the inner face 210X of the first ventilation duct line 210.

In addition, in the present embodiment, a distance L1 between the ventilation duct line opposing face 220B and the inner face 210X of the first ventilation duct line 210 (the distance L1 in a direction perpendicularly intersecting with the direction in which the first ventilation duct line 210 extends) is shorter than a longitudinal-direction length L2 of the bonding face 220A of the second ventilation duct line 220 (the length L2 in the direction in which the first ventilation duct line 210 extends).

Thus, in the present embodiment, the airflow in the first ventilation duct line 210 is smoother than in a case where the distance L1 is longer than the length L2.

Additionally, in the present embodiment, the second ventilation duct line 220 is disposed to extend along the inner face 210X of the first ventilation duct line 210. Thus, the sectional area of the first ventilation duct line 210 is larger (the area occupied by the second ventilation duct line 220 is smaller) so that resistance of the flow channel is reduced.

Further, in the present embodiment, as shown in FIG. 3A, the second ventilation duct line 220 is provided to extend from one end 210S to the other end 210T of the first portion 210A in a width direction.

Specifically, the first portion 210A has a width in a direction intersecting (perpendicularly intersecting) with the direction where the first ventilation duct line 210 extends (the flowing direction of the air). The second ventilation duct line 220 is disposed to extend from the one end 210S to the other end 210T of the first portion 210A in the width direction.

In addition, in the opening portion 310 of the second ventilation duct line 220, a longitudinal-direction length of the opening portion 310 is a length which is 90% or more of the width-direction distance between the one end 210S and the other end 210T of the first portion 210A.

Thus, in the present embodiment, the sound can enter the second ventilation duct line 220 through the opening portion 310 more easily than in a case where the second ventilation duct line 220 is provided only in a partial region of the first portion 210A in the width direction, or a case where the longitudinal-direction length of the opening portion 310 is shorter than 90% of the distance between the one end 210S and the other end 210T.

In other words, in the present embodiment, the longitudinal-direction length (length in a right/right direction in FIG. 3A) of the opening portion 310 is equivalent to the distance between the one end 210S and the other end 210T which are in an opposed relation to each other. More specifically, the distance between the one end 210S which is positioned on the inner face of the first portion 210A and the other end 210T which is positioned on the opposite side to the one end 210S with interposition of the first portion 210A therebetween and also positioned on the inner face, and the length of a long axis of the opening portion 310 are equivalent to each other.

Here, the expression "equivalent" means that the length of the long axis of the opening portion 310 is not shorter than 90% of the distance between the one end 210S and the other end 210T.

As shown in FIG. 3A, the opening portion 310 of the second ventilation duct line 220 is formed into a rectangular shape. Further, the longitudinal direction of the opening portion 310 intersects (perpendicularly intersects) with the flowing direction of the air in the first ventilation duct line 210 (the direction in which the first ventilation duct line 210 extends).

Thus, in the case where the longitudinal direction of the opening portion 310 intersects with the flowing direction of the air in the first ventilation duct line 210, a sound deadening effect is higher and the sound emitted from the first ventilation duct line 210 is smaller than in a case where the longitudinal direction of the opening portion 310 extends along the flowing direction of the air in the first ventilation duct line 210.

Here, the case where the longitudinal direction of the opening portion 310 intersects with the flowing direction of the air in the first ventilation duct line 210 means that the opening portion 310 is formed so that the longitudinal direction of the opening portion 310 overlaps with a direction which forms an angle smaller than 45° with respect to a direction perpendicular to the flowing direction of the air. Incidentally, it will go better if the longitudinal direction of the opening portion 310 is substantially the same direction as the direction perpendicular to the flowing direction of the air.

Incidentally, in the present embodiment, the opening portion 310 has a rectangular shape. However, the shape of the opening portion 310 is not limited to the rectangular shape but may be another shape such as an elliptical shape.

As shown in FIG. 3A, the box 300 formed into the rectangular parallelepiped shape is provided with a first side wall 301 and a second side wall 302 which are in an opposed relation to each other and which are the same in size. In addition, the box 300 is provided with a third side wall 303 and a fourth side wall 304 which are in an opposed relation to each other and which are the same in size.

Further, as shown in FIG. 4, the box 300 is provided with a fifth side wall 305 and a sixth side wall 306 which are in an opposed relation to each other and which are the same in size. In other words, the box 300 in the present embodiment has the three pairs of the side walls which are opposed to each other.

The first side wall 301 and the second side wall 302 extend along the direction in which the first ventilation duct line 210 extends. The third side wall 303 and the fourth side wall 304 extend along the direction intersecting (perpendicularly intersecting) with the direction in which the first ventilation duct line 210 extends. The fifth side wall 305 and the sixth side wall 306 extend along the direction in which the first ventilation duct line 210 extends.

In the present embodiment, of the three pairs of the side walls, one pair of side walls (the fifth side wall 305 and the sixth side wall 306) each having a largest area extend along the inner face of the first ventilation duct line 210. In other words, the one pair of the side walls (the fifth side wall 305 and the sixth side wall 306) extend along the flowing direction of the air in the first ventilation duct line 210.

In other words, in the present embodiment, the rectangular parallelepiped box 300 has the three pairs of the side walls (outer faces) which are opposed to each other, and the fifth side wall 305 which is a side wall included in, of the three pairs of the side walls, the one pair of the side walls each having the largest area has the opening portion 310.

Further, the sixth side wall 306 having the opposed relation to the fifth side wall 305 is bonded to the inner face 210X (see FIG. 4) of the first ventilation duct line 210.

Thus, the first ventilation duct line 210 is arranged to make the airflow more smoothly than in a case where the aforementioned one pair of the side walls (outer faces) each having the largest area are disposed in a relation of intersection with the inner face 210X of the first ventilation duct line 210 (than in a case where the aforementioned one pair of the side walls (outer faces) each having the largest area are disposed in the relation of intersection with the flowing direction of the air). In other words, in the present embodiment, the largest faces of the box 300 extend along the flowing direction of the air so that the air can easily flow in the first ventilation duct line 210.

Figure 5:
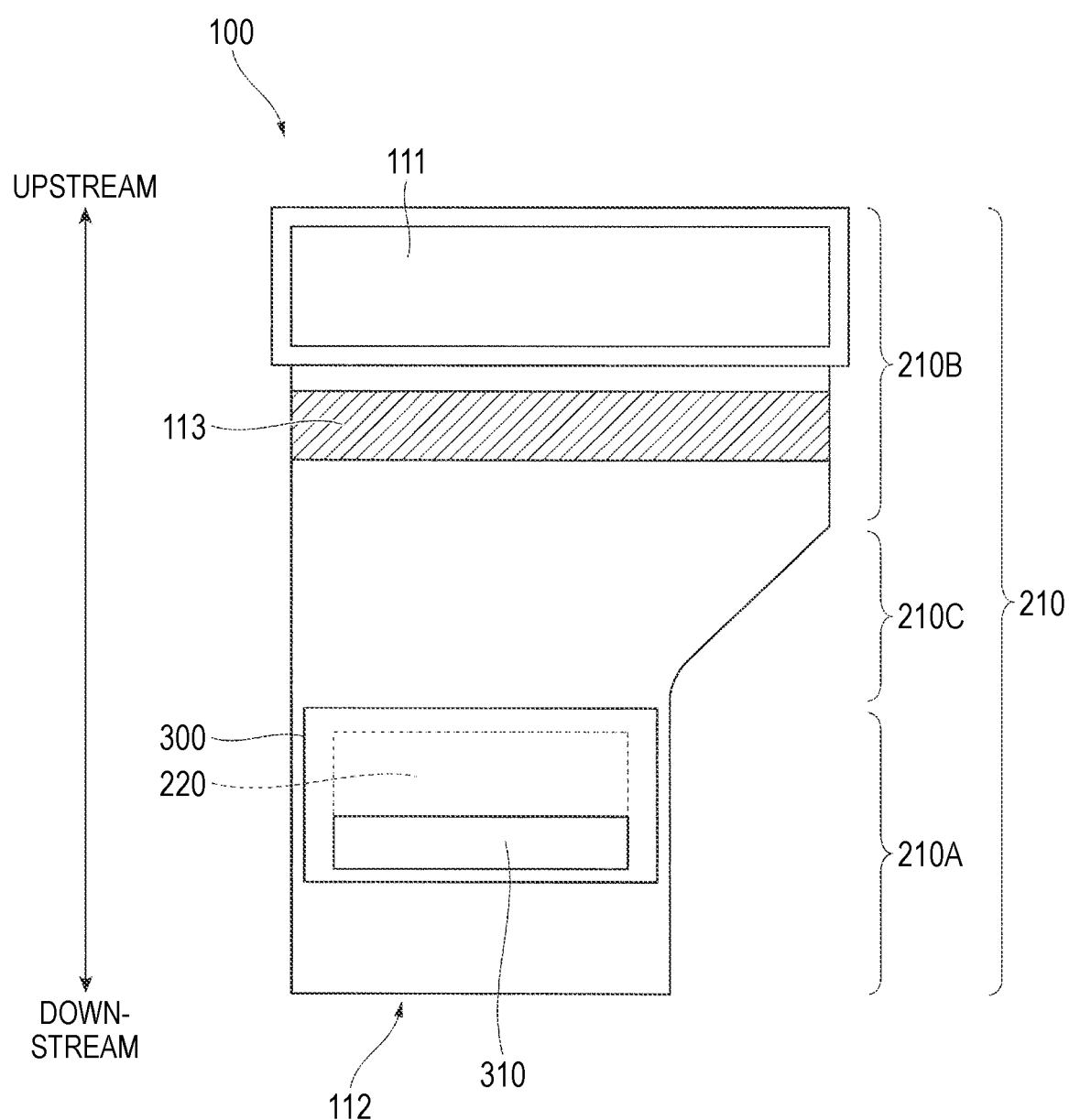
FIG. 5 is a view showing another configuration example of the ventilation duct line assembly.

FIG. 5 is a view showing another configuration example of the ventilation duct line assembly 100.

In this configuration example, a first portion 210A small in sectional area is provided on a side nearer to an air outtake port 112 of a first ventilation duct line 210 than a second portion 210B large in sectional area.

In a similar manner to or the same manner as the aforementioned description, a second ventilation duct line 220 and an opening portion 310 of the second ventilation duct line 220 are provided in the first portion 210A. In addition, a filter 113 is provided in the second portion 210B.

Also in this configuration example, the opening portion 310 is positioned in the first portion 210A where sound collection performance toward the opening portion 310 is increased, and further, the filter 113 is placed in the second portion 210B where a flow rate of air is reduced.

Figure 6:
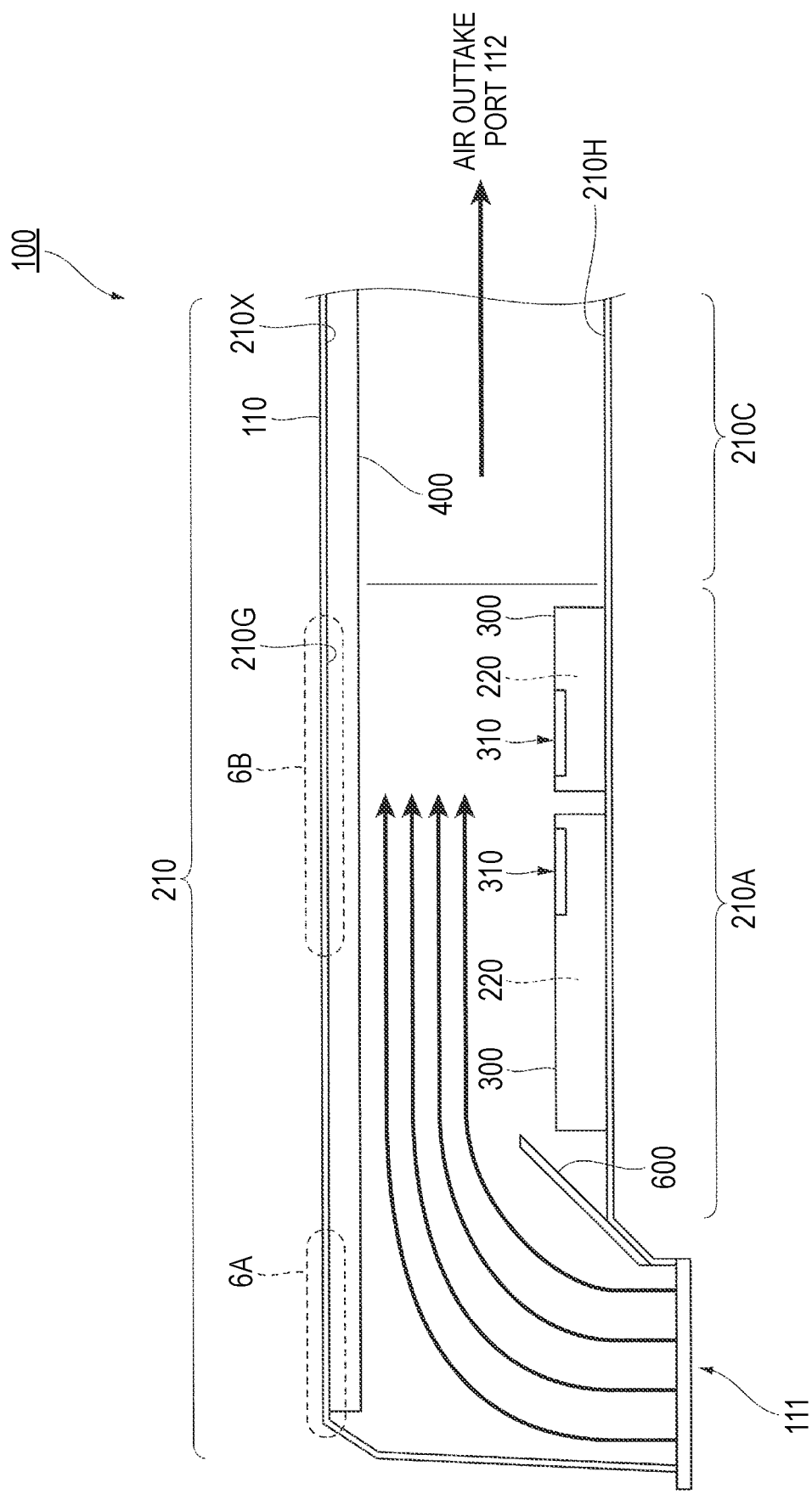
FIG. 6 is a view showing another configuration example of the ventilation duct line assembly.

FIG. 6 is a view showing another configuration example of the ventilation duct line assembly 100.

The case where the first ventilation duct line 210 is disposed to extend along the vertical direction has been described above. However, the first ventilation duct line 210 may be disposed along a horizontal direction or disposed to be inclined with respect to the horizontal direction and the vertical direction. In the other words, the first ventilation duct line 210 may be disposed so that the air outtake port 112 of the first ventilation duct line 210 faces sideways (the direction intersecting with the vertical direction) or faces up.

In the configuration example shown in FIG. 6, a first ventilation duct line 210 is disposed to extend along the horizontal direction, and an air outtake port 112 faces sideways.

In addition, in this configuration example, a first wall portion 210G and a second wall portion 210H which face the first ventilation duct line 210 are provided. More specifically, the first wall portion 210G is constituted by a portion of a tubular member 110, and the second wall portion 210H is constituted by another portion of the tubular member 110.

The first wall portion 210G is formed to extend toward the air outtake port 112 while a portion of the first wall portion 210G is positioned at an opposed place to an air intake port 111. In addition, the second wall portion 210H is positioned at an opposed place to the first wall portion 210G.

Further, in this configuration example, second ventilation duct lines 220 are provided on the second wall portion 210H side. In other words, boxes 300 are bonded to the second wall portion 210H.

Additionally, a portion (a portion referred to by a sign 6A) of an inner face 210X of the first ventilation duct line 210 is opposed to the air intake port 111 of the first ventilation duct line 210 in this configuration example.

Further, a portion (a portion positioned nearer to the air outtake port 112 than the portion referred to by the sign 6A) (a portion referred to by a sign 6B) which is continuous to the portion opposed to the air intake port 111 and which is positioned on the air outtake port 112 side of the inner face 210X is opposed to opening portions 310 of the second ventilation duct lines 220.

In the case of this configuration example, the second ventilation duct lines 220 are provided at the place where an airflow is slow. Thus, resistance of the airflow in the first ventilation duct line 210 is restrained from increasing.

Additionally, the first ventilation duct line 210 has an L-shape to be bent in the present embodiment. The second ventilation duct lines 220 are provided on an inner side of the bent portion (a radially inner side of the bent portion). Thus, the resistance of the airflow of the first ventilation duct line 210 is restrained from increasing.

In addition, in the case of this configuration example, the air striking against the second ventilation duct lines 220 decreases. Accordingly, deposition of a deposit (a deposit constituted by dust etc. contained in the air) onto the boxes 300 constituting the second ventilation duct lines 220 is also restrained.

Further, when the boxes 300 are provided on the first wall portion 210G side in a case where the air is heated, temperature of the boxes 300 rises. If the boxes 300 are, for example, formed out of a material sensitive to heat, there is a fear that the boxes 300 may be deformed.

On the other hand, when the boxes 300 are provided on the second wall portion 210H side as in this configuration example, temperature of the boxes 300 is restrained from rising in comparison with the case where the boxes 300 are provided on the first wall portion 210G side.

Further, in this configuration example, a porous material 400 is placed almost all over an inner face of the first wall portion 210G. In other words, in the present embodiment, the porous material 400 is placed on a first portion 210A, a second portion 210B (not shown in FIG. 6), and a third portion 210C. Here, urethane, nonwoven fabric, glass wool, etc. are exemplified as the porous material 400.

The porous material 400 is excellent in sound absorption characteristic of a high frequency range. On the other hand, the second ventilation duct lines 220 are excellent in low frequency sound absorption characteristic. As a result, sound absorption characteristic in a broad band is improved by the ventilation duct line assembly 100 according to the present embodiment.

Incidentally, the porous material 400 may be provided on the second wall portion 210H side or may be provided on both the first wall portion 210G side and the second wall portion 210H side. In addition, the porous material 400 may be placed all over the inner face of the first ventilation duct line 210.

In addition, in the configuration example shown in FIG. 6, two boxes 300 different in full length (length in a direction in which the first ventilation duct line 210 extends) from each other are provided so that a plurality of kinds of sounds different in frequency from one another can be deadened.

Incidentally, the opening portions 310 belonging to the two boxes 300 respectively are positioned in the first portion 210A of the first ventilation duct line 210 in a similar manner to or the same manner as the above description.

Further, in this configuration example, an air guide member 600 for restraining air from directly travelling toward the boxes 300 is provided on an upstream side of the boxes 300 in a flowing direction of air.

In the present embodiment, the air is made to move toward one side of the boxes 300 by the air guide member 600. Therefore, the air is restrained from directly travelling toward the boxes 300. Thus, the airflow is restrained from being restricted by the boxes 300 so that the air moves more smoothly in the first ventilation duct line 210.

Incidentally, each of the second ventilation duct lines 220 is not limited to a member like the aforementioned box 300. A sheet member made of a resin is, for example, bent and a space enclosed by the sheet member is formed. This space may be used as the second ventilation duct line 220.

In addition, the second ventilation duct line 220 is not limited to the box 300. An internal space of a cylindrical body etc. may be used to form the second ventilation duct line 220.

Figure 7:
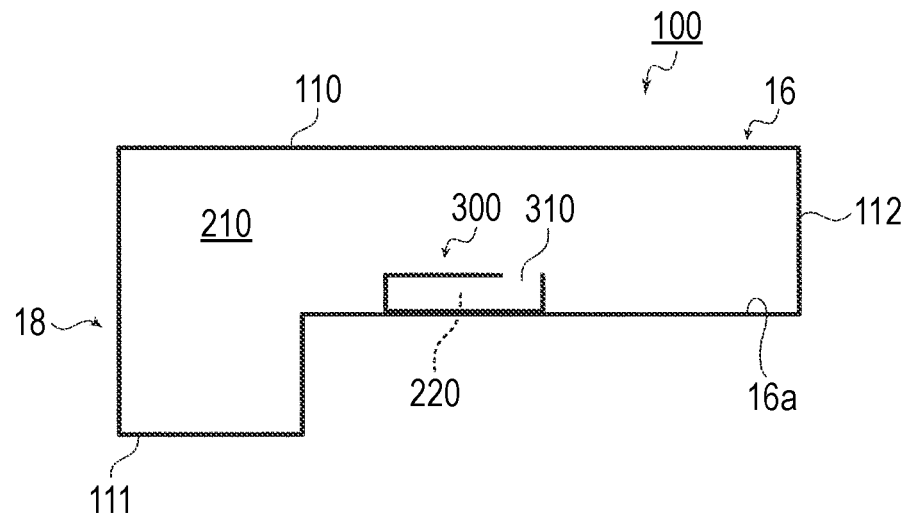
FIG. 7 is a view displaying the ventilation duct line assembly shown in FIG. 6 in a simplified manner.

FIG. 7 is a view displaying the ventilation duct line assembly 100 shown in FIG. 6 in a simplified manner. A sound deadening principle will be described in detail with reference to FIG. 7 and the drawings following FIG. 7.

Incidentally, the sound deadening principle in a ventilation duct line assembly 100 having a configuration similar to or the same as the ventilation duct line assembly 100 shown in FIG. 6 will be described as follows. However, sound is also deadened in a similar manner or the same manner in the ventilation duct line assemblies 100 shown in FIG. 3A, FIG. 3B, FIG. 4, and FIG. 5 by the sound deadening principle which will be described below.

In addition, in FIG. 7, a side of a tubular member 110 on which an air outtake port 112 is provided is formed into a straight shape, and illustration of the aforementioned first portion 210A, the aforementioned second portion 210B, the aforementioned third portion 210C, etc. is omitted from FIG. 7. In addition, only one box 300 (only one second ventilation duct line 220) is placed in FIG. 7.

Figure 8:
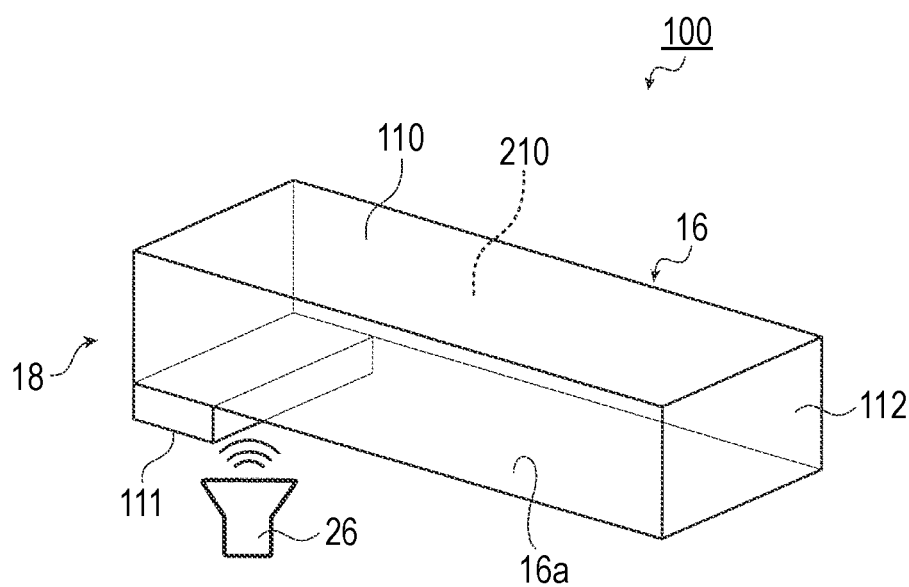
FIG. 8 is a schematic perspective view of the ventilation duct line assembly shown in FIG. 7.
Figure 9:
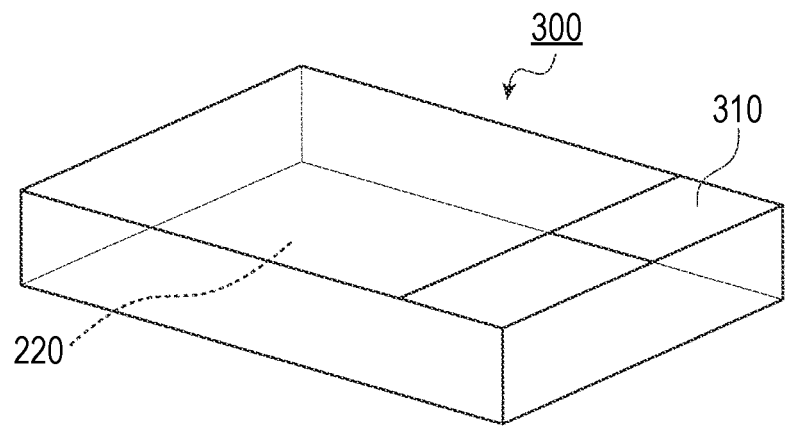
FIG. 9 is a schematic perspective view of a box.

In addition, FIG. 8 is a schematic perspective view of the ventilation duct line assembly 100 shown in FIG. 7. FIG. 9 is a schematic perspective view of the box 300.

As shown in FIG. 7 and FIG. 8, a first ventilation duct line 210 according to the present embodiment includes a straight tube portion 16 and a bent portion 18. The straight tube portion 16 is shaped to be a rectangle in section. The bent portion 18 is bent from the straight tube portion 16 and shaped to be a rectangle in section. Incidentally, the term "bent" is not limited to the portion whose bent angle is $\pi/2$ (90°) but means any portion having a bent angle of 5° or more.

The air outtake port 112 is provided at one end portion of the straight tube portion 16, and the other end portion of the straight tube portion 16 is connected to the bent portion 18. An air intake port 111 is provided at one end portion of the bending portion 18, and the other end portion of the bent portion 18 is connected to the other end portion of the straight tube portion 16.

The first ventilation duct line 210 (the tubular member 110) resonates at a specific frequency to function as an air-column resonator.

The second ventilation duct line 220 (the box 300) is disposed inside the straight tube portion 16 and on a bottom face 16a of the straight tube portion 16. In addition, the second ventilation duct line 220 is shaped to be a rectangular parallelepiped. Further, the second ventilation duct line 220 functions as the air-column resonator. Thus, it is preferable that the second ventilation duct line 220 is a resonator for a sound wave (incident sound).

The second ventilation duct line 220 has an opening portion 310. The opening portion 310 is an opening through which sound is made to enter or leave. The opening portion 310 is disposed on an inner side of the first ventilation duct line 210 (specifically, an inner side of the straight tube portion 16).

In the present embodiment, a structure including the first ventilation duct line 210 which is shaped to be an L-shaped cylinder and the second ventilation duct line 220 is used, so that the first ventilation duct line 210 and the second ventilation duct line 220 are disposed to optimize (1) a natural resonance mode of the first ventilation duct line 210, (2) the position of the opening portion 310 of the second ventilation duct line 220, and (3) a rear length (rear distance) of the second ventilation duct line 220.

That is, in the present embodiment, the second ventilation duct line 220 is disposed inside the first ventilation duct line 210. With this configuration, (i) a peak of transmission loss caused by air-column resonance and (ii) a peak of transmission loss caused by a duct coupling mode (non-resonance) which is the basic principle of the present embodiment that will be described later can be obtained. In the present embodiment, the peak caused by the non-resonance can be obtained by optimizing the aforementioned parameters (1) to (3).

In the present embodiment, the non-resonance peak can be expressed thus. Since not only the transmission loss caused by the resonance but also the transmission loss caused by the non-resonance are expressed, transmission loss in a broad band can be obtained.

The duct coupling mode which is the mechanism of the basic principle of the present embodiment will be described in detail with reference to FIG. 10A to FIG. 10D and FIG. 11.

Figure 10A:
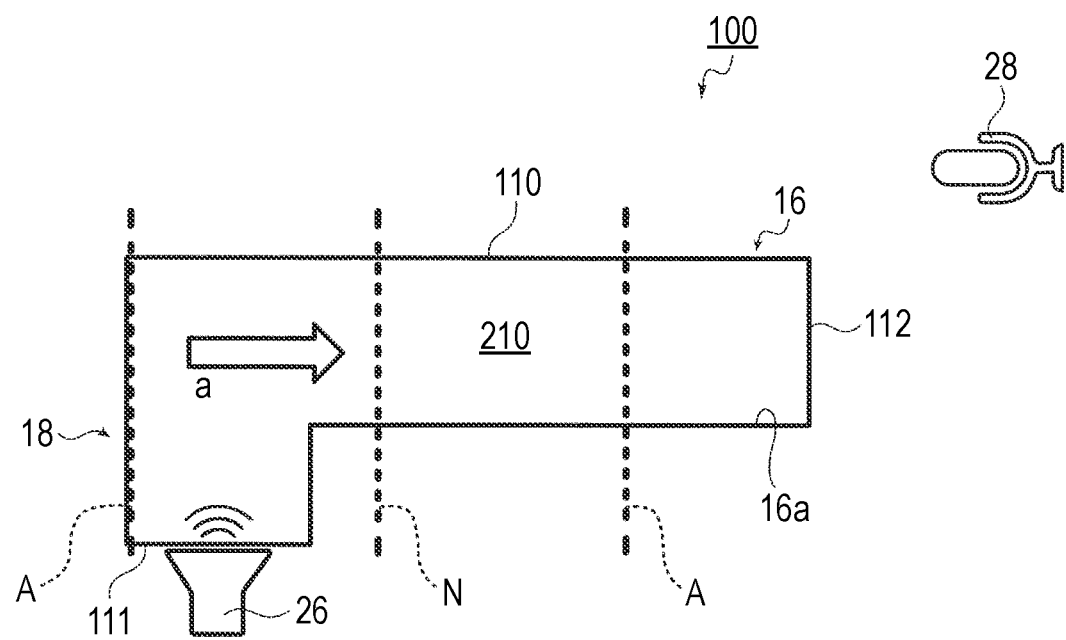
FIG. 10A is a schematic sectional view showing a standing wave with a different frequency.
Figure 10B:
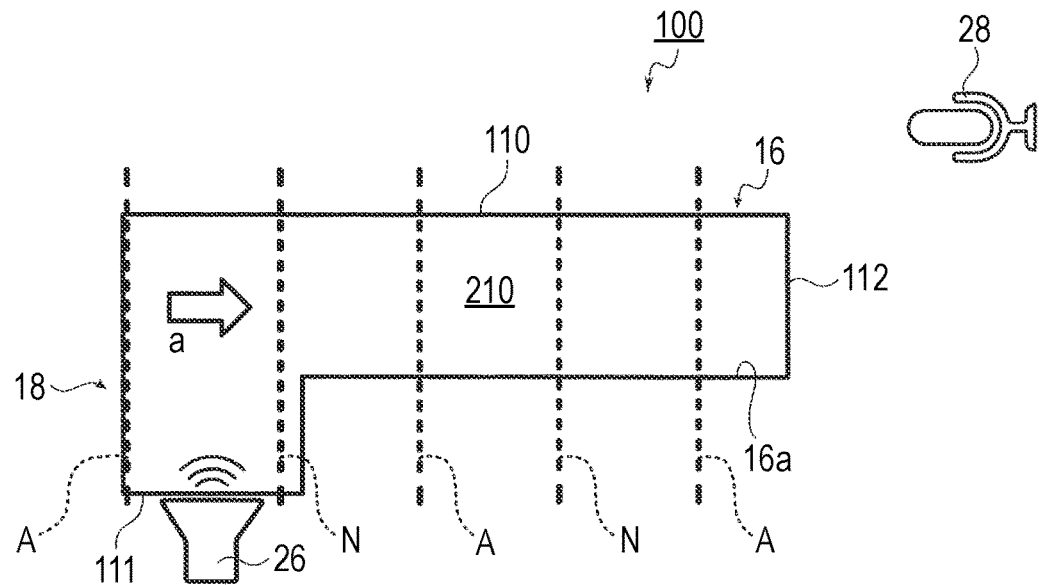
FIG. 10B is a schematic sectional view showing a standing wave with a different frequency.
Figure 10C:
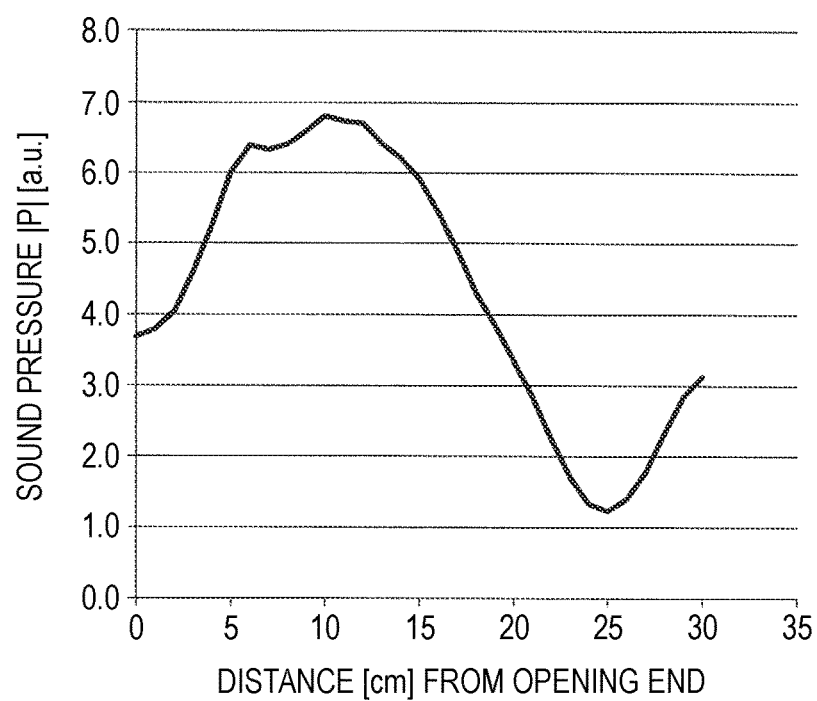
FIG. 10C is a graph showing the relation between a distance from an air outtake port of a ventilation duct line assembly and a sound pressure distribution of the standing wave with the frequency.
Figure 10D:
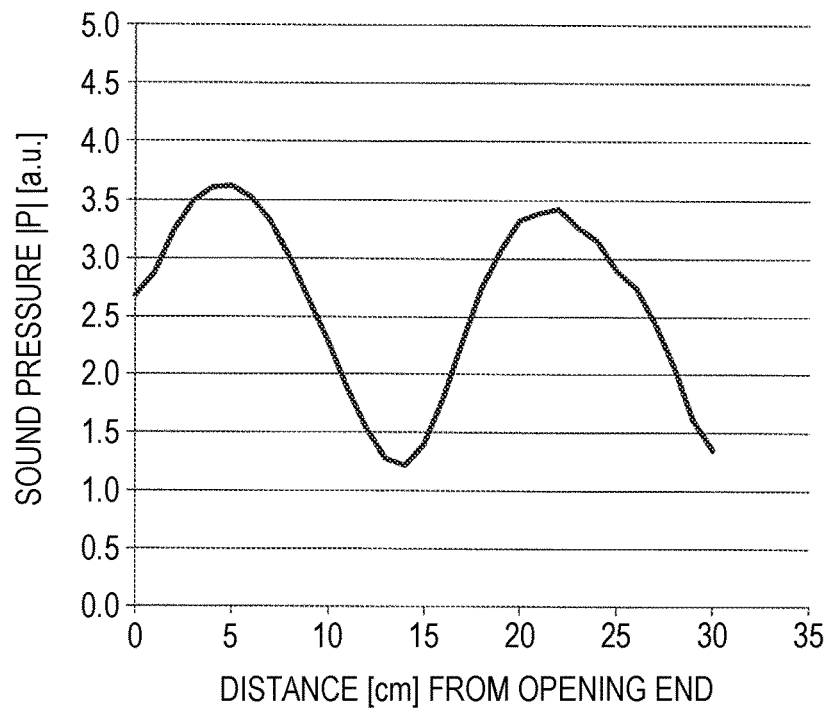
FIG. 10D is a graph showing the relation between a distance from the air outtake port of the ventilation duct line assembly and a sound pressure distribution of the standing wave with the frequency.
Figure 11:
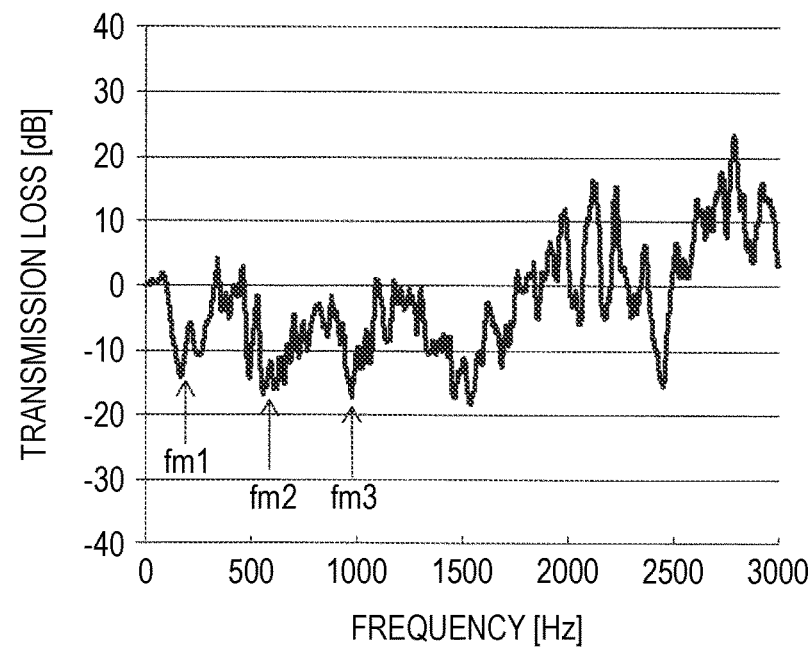
FIG. 11 is a graph showing a relation between transmission loss of the ventilation duct line assembly and frequency.

FIG. 10A and FIG. 10B are schematic sectional views showing standing waves of different frequencies formed in the ventilation duct line assembly 100 shown in FIG. 7. FIG. 10C and FIG. 10D are graphs respectively showing relations between distances from the air outtake port (opening end) 112 of the ventilation duct line assembly 100 shown in FIG. 10A and FIG. 10B and sound pressure distributions of the standing waves of the frequencies. FIG. 11 is a graph showing a relation between transmission loss of the ventilation duct line assembly 100 shown in FIGS. 10A and 10B and frequency.

In FIG. 10A and FIG. 10B, a sound source (speaker) 26 is placed in the air intake port 111 of the first ventilation duct line 210.

As shown in FIG. 10A and FIG. 10B, sound propagated from the sound source 26 placed in the air intake port 111 of the first ventilation duct line 210 flows in a direction designated by an arrow a, and is then radiated from the air outtake port 112 of the straight tube portion 16 of the first ventilation duct line 210. The sound radiated from the air outtake port 112 is measured by a measurement device such as a microphone 28 placed outside the first ventilation duct line 210.

A frequency of easy-to-pass sound (transmitted sound) and a frequency of difficult-to-pass sound (transmitted sound) which are uniquely determined by the size (such as volume, dimensions, etc.) of the first ventilation duct line 210 are present in the first ventilation duct line 210 having at least one air outtake port 112, as shown in FIG. 10A and FIG. 10B.

That is, the first ventilation duct line 210 per se behaves likes a sound selecting filter, and performance of the filter is determined by the first ventilation duct line 210.

This is caused by a phenomenon in which sound having a specific frequency (600 Hz in FIG. 10A or 1000 Hz in FIG. 10B) or wavelength corresponding to the volume and shape of the first ventilation duct line 210 forms a stable standing wave (i.e. mode) inside the first ventilation duct line 210, and the sound forming such a mode particularly easily comes out of the first ventilation duct line 210.

The example shown in FIG. 10A is the mode (standing wave) of the 600 Hz sound, which has antinodes A (Antinode) on opposite sides and a node N (Node) between the antinodes A. In addition, the example shown in FIG. 10B is the mode (standing wave) of the 1000 Hz sound, which has antinodes A on opposite sides and at the center and nodes N between adjacent ones of the antinodes A.

Incidentally, in the present embodiment, when each absolute value of sound pressure is measured along a waveguide of the first ventilation duct line 210 by the microphone 28, a position (place) where the absolute value of the sound pressure is maximum is defined as an antinode A of the sound pressure, and a position (place) where the absolute value of the sound pressure is minimum is defined as a node N of the sound pressure.

The graphs shown in FIG. 10C and FIG. 10D show results of the sound pressures (absolute values) measured at 600 Hz and 1000 Hz respectively. Each result was measured while a distal end of the microphone 28 was shifted by 1 cm each time from the vicinity of the sectional center of the waveguide of the air outtake port 112 of the first ventilation duct line 210 toward a deep side of the first ventilation duct line 210.

It is known that, in the graphs shown in FIG. 10C and FIG. 10D, positions indicating the maximum values of the sound pressures are the positions of the antinodes A of the sound pressures shown in FIG. 10A and FIG. 10B, and positions indicating the minimum values of the sound pressures are the positions of the nodes N of the sound pressures shown in FIG. 10A and FIG. 10B.

However, the mode in which sound easily comes out of the first ventilation duct line 210 is formed at a plurality of frequencies in the first ventilation duct line 210, and frequencies fm1, fm2 (600 Hz), fm3 (1000 Hz), . . . at each of which transmission loss reaches a minimum value appear, as shown in FIG. 11. That is, resonance of the first ventilation duct line 210 can be defined as resonance generated at any one of the frequencies having the minimum values in frequency dependence of the transmission loss.

Figure 12:
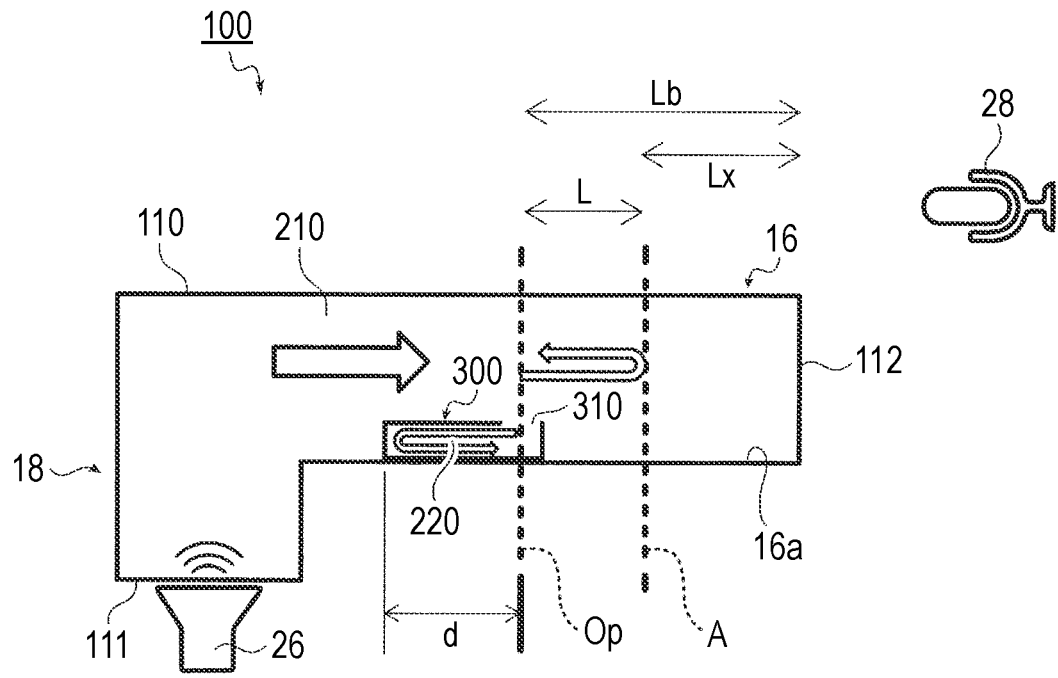
FIG. 12 is a schematic sectional view illustrating a sound deadening (soundproofing) principle.

According to research of the present inventors, it has been proved that when the second ventilation duct line 220 having the opening portion 310 is placed in such a first ventilation duct line 210 as shown in FIG. 12 (a schematic sectional view illustrating the sound deadening (soundproofing) principle), sound can be inhibited from easily coming out of the first ventilation duct line 210.

Here, a situation of a stable mode which is peculiar to the first ventilation duct line 210 and which has been formed by only the first ventilation duct line 210 changes when the second ventilation duct line 220 is placed. A duct coupling mode which is a stable mode generated by the first ventilation duct line 210 and the second ventilation duct line 220 is formed so that sound can be confined by the duct coupling mode.

Further, in the present embodiment, reradiated sound of sound entering the second ventilation duct line 22 interferes with sound returning in the first ventilation duct line 210, so that the reradiated sound and the returning sound are intensified with each other. Thus, an effect of making the sound further difficult to come out on the air outtake port 112 side of the first ventilation duct line 210 is also expressed.

The present inventors have known that the following requirement has to be satisfied in order to express increases of the aforementioned transmission losses (i) and (ii) simultaneously.

Define a phase difference $\theta1$ [rad.] between sound (incident sound) incident on the second ventilation duct line 220 and sound (reradiated sound) reradiated from the second ventilation duct line 220 with respect to the incident sound. For at least one of maximum values of sound pressure formed inside the first ventilation duct line 210, define a phase difference $\theta2$ [rad.]=$2\pi \times 2L/\lambda$[rad.] where L designates a distance between the position of the opening portion 310 or a radiation face of the first ventilation duct line 210 and the position of the first ventilation duct line 210 where the sound pressure is the maximum value, and $\lambda$ designates a wavelength of the incident and reradiated sound. On this occasion, the following expression (1) has to be satisfied.

$$|\theta1-\theta2| \leq \pi/2 [\text{rad.}] \qquad (1)$$

Here, an allowable range of the phase difference $\theta1$ [rad.] between the sound (reradiated sound) reradiated from the second ventilation duct line 220 and the incident sound is set at 0 to $2\pi$. That is, the phase difference $\theta1$ satisfies $0 \leq \theta1 \leq 2\pi$.

Incidentally, the fact that the allowable range of the phase difference $\theta1$ is set at 0 to $2\pi$ means that $\theta1$ may be regarded as $\theta$s even if the phase difference $\theta1$ is out of the range of 0 to 2π, e.g. in a case of θ1=θs+2nπ (wherein: 0≤θs≤2π, n: an integer). That is, the fact is synonymous with θ1=θs in any case in the present embodiment.

Incidentally, the unit [rad.] of the phase difference will be omitted below.

Here, the sound pressure of the sound formed inside the first ventilation duct line 210 means the sound pressure of the sound forming a sound pressure distribution inside the first ventilation duct line 210, preferably the sound pressure of the sound forming a standing wave inside the first ventilation duct line 210.

In addition, a wavelength of the sound means a wavelength of the sound forming the sound pressure distribution inside the first ventilation duct line 210, preferably, for example, a wavelength of the sound having a specific frequency or wavelength corresponding to the volume and shape of the first ventilation duct line 210, more preferably a waveform of the sound forming a standing wave (i.e. mode) uniform and stable inside the first ventilation duct line 210 and forming such a mode.

In addition, in the present embodiment, the position of the opening portion 310 of the second ventilation duct line 220 means the position of the center of gravity of the opening portion 310, and the position of a radiation face of the second ventilation duct line 220 means the position of the center of gravity of the radiation face.

The ground of the aforementioned expression (1) is based on the following principle.

The principle will be described in detail with reference to FIG. 12.

FIG. 12 is a schematic sectional view illustrating the principle of the present embodiment.

In the present embodiment, as shown in FIG. 12, when the second ventilation duct line 220 is present, a sound wave flowing through the first ventilation duct line 210 is separated into sound (incident sound) entering the second ventilation duct line 220, and sound (transmitted sound) flowing through the first ventilation duct line 210 as it is.

The sound entering the second ventilation duct line 220 leaves the second ventilation duct line 220 and returns to the inside of the first ventilation duct line 210. On this occasion, a finite phase difference θ1 is given between when the sound enters the second ventilation duct line 220 and when the sound leaves the second ventilation duct line 220. Specifically, for example, the phase difference θ1 (=2π×2d/λ) depending on a rear distance d of the second ventilation duct line 220 is given.

Here, as shown in FIG. 12, the phase difference θ1 can be mentioned as a phase difference at a position Op of the opening portion 310 between sound entering the second ventilation duct line 220 through the opening portion 310 and the sound (reradiated sound) reradiated from the opening portion 310. Incidentally, the position Op of the opening portion 310 is defined as a position of the center of gravity of an opening face of the opening portion 310.

In addition, the rear length or the rear distance d of the second ventilation duct line 220 is defined as a length between the position Op of the opening portion 310 which is the position of the center of gravity of the opening face of the opening portion 310 and an end portion of the second ventilation duct line 220 (end portion in the flowing direction of the air in the first ventilation duct line 210).

On the other hand, as for the sound (transmitted sound) flowing through the first ventilation duct line 210 as it is, there is, for example, a mode (independent standing wave) which is defined by the structure of the first ventilation duct line 210, or a sound wave which is reflected from the air outtake port 112 of the first ventilation duct line 210 and a sound wave which flows through the first ventilation duct line 210 toward the air outtake port 112 interfere with each other to thereby form a maximum value or an antinode A and a minimum value or a node N of sound pressure.

In this case, the sound (transmitted sound) flowing through the first ventilation duct line 210 as it is returns again to pass through the second ventilation duct line 220 in a reverse direction. On this occasion, the sound advances to a place of the antinode A or the maximum value of the standing wave (mode), and a phase difference θ2 which is generated when the sound returns from the place of the antinode A or the maximum value of the standing wave (mode) establishes a relation of θ2=2π/2L/λ, where L designates a distance between the place of the antinode A or the maximum value of the standing wave (a position in the first ventilation duct line 210 such as the position of the antinode A) and the opening portion 310 or the radiation face of the second ventilation duct line 220.

Here, the phase difference θ2 can be mentioned as a phase difference of sound which does not enter the second ventilation duct line 220 but returns to the position Op of the opening portion 310, as shown in FIG. 12.

Incidentally, in FIG. 12, a distance between the air outtake port 112 of the first ventilation duct line 210 and the position inside the first ventilation duct line 210 (e.g. the position of the antinode A) where the sound pressure takes the maximum value is defined as Lx, and a distance between the air outtake port 112 of the first ventilation duct line 210 and the position Op of the opening portion 310 of the second ventilation duct line 220 is defined as Lb. On this occasion, the distance L is given as a difference between the distance Lb and the distance Lx (L=Lb−Lx). Incidentally, it can be said that the distance L is half of a distance through which the sound flowing through the first ventilation duct line 210 moves back and forth.

In addition, in the present embodiment, it is preferable that the position of the first ventilation duct line 210 where the sound pressure reaches the maximum value is the antinode A of the standing wave of the sound formed by the first ventilation duct line 210.

In addition, as will be described later, it is preferable that the first ventilation duct line 210 has resonance to satisfy the aforementioned expression (1) at a frequency fm where the resonance occurs.

When the phase difference between sound entering the second ventilation duct line 220 through the opening portion 310 of the second ventilation duct line 220 and the sound (reradiated sound) leaving the second ventilation duct line 220 through the opening portion 310 and the phase difference between the sound flowing through the first ventilation duct line 210 as it is and the sound returning to the position Op of the opening portion 310 of the second ventilation duct line 220 (transmitted sound reflected and then returned) coincide with each other or have a small difference, that is, when the phase difference θ1 and the phase difference θ2 coincide with each other or have a small difference, amplitude of the sound which returns to the inside of the first ventilation duct line 210 increases. In this case, the sound is apt to stay inside the first ventilation duct line 210 to thereby increase transmission loss.

Here, it is preferable that the second ventilation duct line 220 is a resonator which satisfies the aforementioned expression (1) at a different frequency from a resonance frequency of the second ventilation duct line 220.

In addition, it is preferable that transmission loss is maximum at the frequency of the sound wave satisfying the aforementioned expression (1).

In the state of the large transmission loss, the transmission loss is largest when $|θ1−θ2|=0$, and decreases as $|θ1−θ2|$ is displaced from 0.

On the other hand, when the value of $|θ1−θ2|$ exceeds $π/2$, a strong duct coupling mode is more difficult to be formed in comparison with the case of $|θ1−θ2|=0$. Therefore, the transmission loss may be reduced to amplify the sound (the sound is more easily emitted from the ventilation duct line assembly 100).

Therefore, it is necessary to limit the value of $|θ1−θ2|$ to $π/2$ or less (i.e. $|θ1−θ2|≤π/2$).

In addition, the present inventors have also known that the following requirement has to be satisfied in order to express increases of the aforementioned transmission losses (i) and (ii) simultaneously.

Specifically, the second ventilation duct line 220 has a resonance frequency fr [Hz], and has to satisfy the following expression (2)

$$0 ≤ La1 ≤ λfma/4 \quad (2)$$

at a highest frequency fma [Hz] among frequencies which are lower than the resonance frequency fr among frequencies fm1, fm2, fm3, . . . (see FIG. 11) at each of which transmission loss is minimum about a transmission loss spectrum of the first ventilation duct line 210 when La1 designates a distance between the opening portion 310 of the second ventilation duct line 220 and a position of the first ventilation duct line 210 at which the sound pressure reaches a maximum value (e.g. an antinode A) which is nearest to the position Op of the opening portion 310 with respect to the same direction as a flowing direction of the sound at the frequency fma, and λfma designates a wavelength at the frequency fma.

The ground of the aforementioned expression (2) is based on the following principle.

The principle will be described in detail with reference to FIG. 13.

Figure 13:
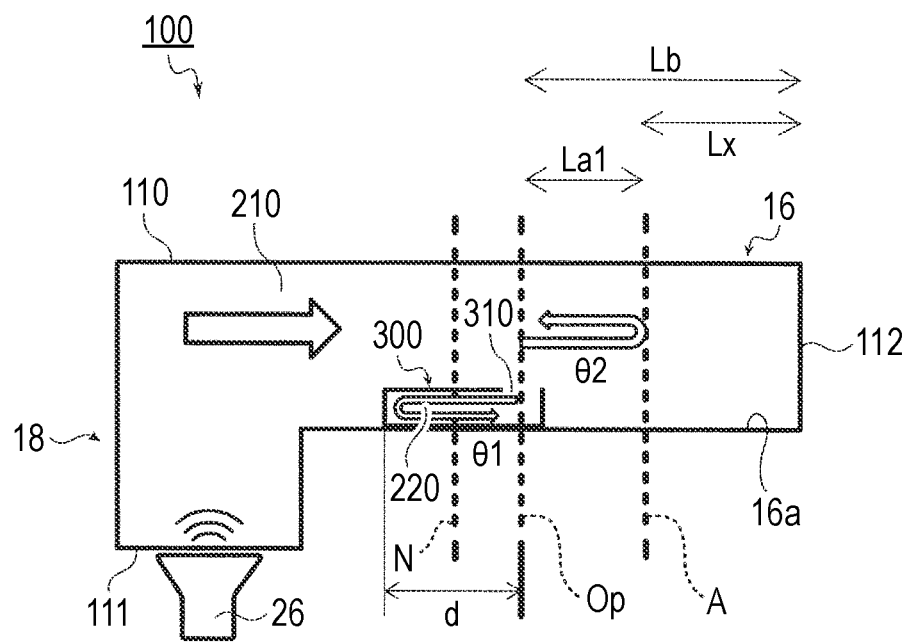
FIG. 13 is a schematic sectional view illustrating a sound deadening (soundproofing) principle.

FIG. 13 is a schematic sectional view illustrating a sound deadening (soundproofing) principle.

Also in FIG. 13, assume that sound of the sound source 26 flows through the inside of the first ventilation duct line 210, as described above. On this occasion, when a phase difference θ1 between the sound entering the second ventilation duct line 220 through the opening portion 310 and the sound (reradiated sound) reradiated from the opening portion 310 and a phase difference θ2 between the sound flowing through the first ventilation duct line 210 as it is and the sound returning to the position (e.g. the central position) of the opening portion 310 of the second ventilation duct line 220 have a small difference, the sound is apt to stay inside the first ventilation duct line 210 to thereby increase transmission loss.

Incidentally, in the present embodiment, when there is one opening like the air outtake port 112, the flowing direction of the sound can be defined as a direction from the inside of the ventilation duct line assembly toward the opening portion.

In addition, when a plurality of openings like the air intake port 111 and the air outtake port 112 according to the present embodiment are present, and the sound source 26 such as a noise source is absent from the inside of the ventilation duct line assembly, sound pressure can be measured by a measurement microphone at each of the openings, and the flowing direction of the sound can be defined as a direction from one of the openings where the sound pressure is large toward another of the openings where the sound pressure is small.

In addition, when the sound source 26 such as the noise source is present in the inside of the ventilation duct line assembly, the flowing direction of the sound can be defined as a direction from the sound source 26 toward each of the openings.

Here, as shown in FIG. 13, when the sound flowing through the first ventilation duct line 210 is the sound of the frequency fma at which transmission loss takes a minimum value to allow the sound to be easily transmitted through the first ventilation duct line 210, the position inside the first ventilation duct line 210 (e.g. the position of the antinode A) where the sound flowing and passing through the position Op of the opening portion 310 of the second ventilation duct line 220 is reflected on the position Op side of the opening portion 310 and where the sound pressure takes a maximum value is located nearer to the air outtake port 112 of the first ventilation duct line 210 than the position Op of the opening portion 310.

On the other hand, a position inside the first ventilation duct line 210 (e.g. a position of an anode N) at which the sound pressure of the sound of the frequency fma flowing through the first ventilation duct line 210 takes a minimum value is a position nearer to the air intake port 111 of the first ventilation duct line 210 than the opening portion 310 of the second ventilation duct line 220.

Accordingly, the distance La1 between the position Op of the opening portion 310 of the second ventilation duct line 220 and the position inside the first ventilation duct line 210 (e.g. the position of the antinode A) where the sound pressure takes the maximum value is not longer than λfma/4 which is a distance between the position inside the first ventilation duct line 210 (e.g. the position of the antinode A) where the sound pressure takes the maximum value and the position inside the first ventilation duct line 210 (e.g. the position of the node N) where the sound pressure takes the minimum value.

That is, in the present embodiment, in order to increase a sound deadening effect for the sound of the frequency fma on the lower frequency side than the resonance frequency fr, the distance La1 is limited to a value not shorter than 0 and not longer than λfma/4 to satisfy the aforementioned expression (2).

From the above description, the position Op of the opening portion 310 of the second ventilation duct line 220 is preferably located at a position different from the position of the node N (a position which is not the node N).

Incidentally, as shown in FIG. 13, it can be said that the distance La1 is half of the distance through which the sound flowing through the first ventilation duct line 210 moves back and forth. The distance La1 is given as a difference between the distance Lb and the distance Lx (La1=Lb−Lx).

In the present embodiment, the distance La1 is limited to the aforementioned expression (2) for the following reason.

First, the frequency fma on the lower frequency side is a frequency lower than the resonance frequency fr of the second ventilation duct line 220. Accordingly, at the frequency fma, the phase difference θ1 ($=2d×2π/λfma$) is smaller than π. On the other hand, the phase difference θ2 generated by the sound moving through the distance La1 back and forth is $π(=2La1×2π/λfma)$ when the distance La1 is equal to λfma/4. Since θ1 is smaller than π, La1 has to be not longer than λ/4 in order to make the value of $|θ1−θ2|$ close to 0.

Incidentally, when the rear length (rear distance) of the second ventilation duct line 220 is defined as d, it is preferable that the rear length (rear distance) d satisfies the following expression (3).

$$d < \lambda fma/4 \quad (3)$$

The sound entering the second ventilation duct line 220 through the opening portion 310 and reradiated from the opening portion 310 moves through the rear length d back and forth. A difference between the phase difference θ1 corresponding to the distance d through which the sound entering the second ventilation duct line 220 moves back and forth and the phase difference θ2 corresponding to the distance La1 through which the sound flowing through the first ventilation duct line 210 moves back and forth is small. Therefore, it can be said that the rear length d of the second ventilation duct line 220 preferably satisfies the aforementioned expression (3) so long as La1 satisfies the aforementioned expression (2). This is the reason why the rear length d is limited to the aforementioned expression (3).

Incidentally, the opening portion 310 of the second ventilation duct line 220 is preferably placed within the wavelength λfma from the air outtake port 112 of the first ventilation duct line 210.

The air outtake port 112 of the first ventilation duct line 210 is located on the side nearer to a position where the sound pressure takes a minimum value (e.g. a position of a node N) when viewed from the position inside the first ventilation duct line 210 (e.g. the position of the antinode A) where the sound pressure takes the maximum value, but the air outtake port 112 of the first ventilation duct line 210 does not reach the position where the sound pressure takes the minimum value. Therefore, the distance Lx between the air outtake port 112 of the first ventilation duct line 210 and the position inside the first ventilation duct line 210 (e.g. the position of the antinode A) where the sound pressure takes the maximum value is shorter than λfma/2. That is, Lx<λfma/2.

On the other hand, the distance Lb between the air outtake port 112 of the first ventilation duct line 210 and the position Op of the opening portion 310 of the second ventilation duct line 220 is given as the sum of the distance La1 and the distance Lx (Lb=La1+Lx). Accordingly, Lb=La1+Lx<λfma/4+λfma/2=3λfma/4. Thus, Lb<λfma.

That is, the distance between the air outtake port 112 of the first ventilation duct line 210 and the position Op of the opening portion 310 of the second ventilation duct line 220 is shorter than λfma. Accordingly, it can be said that the opening portion 310 of the second ventilation duct line 220 is preferably placed within the wavelength λfma from the air outtake port 112 of the first ventilation duct line 210. This is the reason.

In addition, the present inventors have also known that the following requirement has to be satisfied in order to express increases of the aforementioned transmission losses (i) and (ii) simultaneously.

Specifically, the second ventilation duct line 220 has the resonance frequency fr [Hz], and preferably satisfies the following expression (4)

$$\lambda fmb/4 \leq La2 \leq \lambda fmb/2 \quad (4)$$

at a lowest frequency fmb [Hz] of frequencies which are higher than the resonance frequency fr among the frequencies fm1, fm2, fm3, . . . (see FIG. 11) at each of which transmission loss is minimum about the transmission loss spectrum of the first ventilation duct line 210 when La2 designates a distance between the opening portion 310 of the second ventilation duct line 220 and the position of the first ventilation duct line 210 at which the sound pressure reaches the maximum value (e.g. the antinode A) and which is nearest to the position Op of the opening portion 310 with respect to the same direction as the flowing direction of the sound at the frequency fmb, and λfmb designates a wavelength at the frequency fmb.

The ground of the aforementioned expression (4) is based on the following principle.

The principle will be described in detail with reference to FIG. 14.

Figure 14:
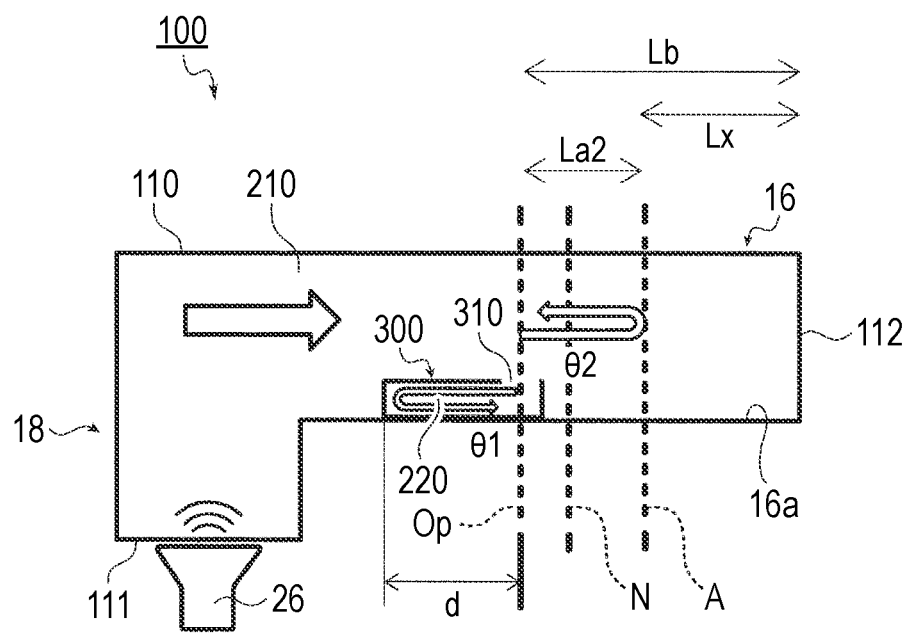
FIG. 14 is a schematic sectional view illustrating a sound deadening principle.

FIG. 14 is a schematic sectional view illustrating a sound deadening principle.

Also in the configuration shown in FIG. 14, assume that sound of the sound source 26 flows through the inside of the first ventilation duct line 210, as described above. On this occasion, when the phase difference θ1 between the sound entering the second ventilation duct line 220 through the opening portion 310 and the sound (reradiated sound) reradiated from the opening portion 310 and the phase difference θ2 between the sound flowing through the first ventilation duct line 210 as it is and the sound returning to the position (e.g. the central position) Op of the opening portion 310 of the second ventilation duct line 220 (transmitted sound reflected and then returned) have a small difference, the sound is apt to stay inside the first ventilation duct line 210 to thereby increase transmission loss.

Here, as shown in FIG. 14, when the sound flowing through the first ventilation duct line 210 is the sound of the frequency fmb easily transmitted through the first ventilation duct line 210 (i.e. the transmission loss takes the minimum value), the position inside the first ventilation duct line 210 (the position of the antinode A) where the sound (transmitted sound) flowing and passing through the position Op of the opening portion 310 of the second ventilation duct line 220 is reflected on the position Op side of the opening portion 310 (i.e. the sound pressure takes the maximum value) is nearer to the air outtake port 112 of the tube structure 12 than the position Op of the opening portion 310.

On the other hand, a position inside the tube structure 12 (e.g. a position of a node N) at which the sound pressure of the sound of the frequency fmb flowing through the first ventilation duct line 210 takes a minimum value is a position between the position Op of the opening portion 310 of the second ventilation duct line 220 and the position inside the first ventilation duct line 210 (e.g. the position of the antinode A) where the sound pressure takes the maximum value.

Accordingly, a distance La2 between the position Op of the opening portion 310 of the second ventilation duct line 220 and the position inside the first ventilation duct line 210 (e.g. the position of the antinode A) at which the sound pressure takes the maximum value is not shorter than λfmb/4 which is the distance where the position inside the first ventilation duct line 210 (e.g. the position of the antinode A) where the sound pressure takes the maximum value and the position inside the first ventilation duct line 210 (e.g. the position of the node N) where the sound pressure takes the minimum value.

In addition, as shown in FIG. 14, the position inside the first ventilation duct line 210 (e.g. the position of the node N) where the sound pressure takes the minimum value is nearer to the position Op of the opening portion 310 of the second ventilation duct line 220 than the position inside the first ventilation duct line 210 (e.g. the position of the antinode A) where the sound pressure takes the maximum value. Accordingly, the distance La2 is not longer than λfmb/2.

That is, in the present embodiment, in order to increase a sound deadening effect for the sound of the frequency fmb on the higher frequency side than the resonance frequency fr, the distance La2 is limited to be not shorter than λfmb/4 and not longer than λfmb/2 to satisfy the aforementioned expression (4).

From the above description, the position Op of the opening portion 310 of the second ventilation duct line 220 is preferably located at a position different from the position of the node N (a position which is not the node N).

Incidentally, as shown in FIG. 14, it can be said that the distance La2 is half of the distance through which the sound flowing through the first ventilation duct line 210 moves back and forth. The distance La2 is given as a difference between the distance Lb and the distance Lx (La2=Lb−Lx).

In the present embodiment, the distance La2 is limited to the aforementioned expression (4) for the following reason.

First, the frequency fmb on the higher frequency side is a frequency higher than the resonance frequency fr of the second ventilation duct line 220. Accordingly, the difference θ1 (=2d×2π/λfmb) at the frequency fmb is larger than π.

On the other hand, the phase difference θ2 generated by the sound moving through the distance La2 back and forth is π(=2La2×2π/λfmb) when La2=λfmb/4. Since θ1 is larger than π, θ2 has to be made larger than π in order to make the value of |θ1−θ2| close to 0. Accordingly, La2 has to satisfy La2≤λ/4.

On the other hand, when the distance La2 is longer than λ/2, the distance La2 exceeds an adjacent antinode of sound pressure so that the position of the maximum value of the sound pressure which has been defined above changes. Due to this, La2 which has been defined so far is shorter than λfmb/4 unsuitably. Therefore, La2 has to satisfy La2≤λ/2.

Incidentally, the opening portion 310 of the second ventilation duct line 220 is preferably placed within the wavelength λfmb from the air outtake port 112 of the first ventilation duct line 210.

The air outtake port 112 of the first ventilation duct line 210 is located nearer to a position (e.g. a position of a node) where the sound pressure takes a minimum value when viewed from the position inside the first ventilation duct line 210 (e.g. the position of the antinode A) where the sound pressure takes the minimum value, but does not reach the position where the sound pressure takes the minimum value. Therefore, the distance Lx between the air outtake port 112 of the first ventilation duct line 210 and the position inside the first ventilation duct line 210 (e.g. the position of the antinode A) where the sound pressure takes the maximum value is shorter than λfmb/2. That is, Lx<λfmb/2.

On the other hand, the distance Lb between the air outtake port 112 of the first ventilation duct line 210 and the position Op of the opening portion 310 of the second ventilation duct line 220 is given as the sum of the distance La2 and the distance Lx (Lb=La2+Lx). Accordingly, Lb=La2+Lx<λfmb/2+λfma/2=λfmb. Thus, Lb<λfmb.

That is, the distance between the air outtake port 112 of the first ventilation duct line 210 and the position Op of the opening portion 310 of the second ventilation duct line 220 is shorter than λfmb.

Accordingly, it can be said that the opening portion 310 of the second ventilation duct line 220 is preferably placed within the wavelength λfmb from the air outtake port 112 of the first ventilation duct line 210. This is the reason.

Incidentally, in the embodiment shown in FIG. 13 or the embodiment shown in FIG. 14, the opening portion 310 of the second ventilation duct line 220 is preferably placed within the wavelength λfma or the wavelength λfmb from the air outtake port 112 of the first ventilation duct line 210. Accordingly, it can be said that the opening portion 310 of the second ventilation duct line 220 is preferably placed within the wavelength λ from the air outtake port 112 of the first ventilation duct line 210 in a similar manner or the same manner also in the embodiment shown in FIG. 12.

In the embodiment shown in FIG. 13 or the embodiment shown in FIG. 14, the opening portion 310 of the second ventilation duct line 220 is preferably disposed at the position which is not the node N. Here, the position which is not the node N means that the position excluding the node N and distant from the node N by about λfma/8 or λfmb/8.

Incidentally, the tubular shape of the first ventilation duct line 210 may be the aforementioned bent tube shape (L-shape) but is not limited particularly. The first ventilation duct line 210 may be a linear type tube shape. However, the first ventilation duct line 210 is preferably bent.

In addition, the sectional shape of the first ventilation duct line 210 is also not limited particularly but may be any shape. For example, the sectional shape of the first ventilation duct line 210 may be a regular polygon such as a square, an equilateral triangle, a regular pentagon, or a regular hexagon.

In addition, the sectional shape of the first ventilation duct line 210 may be a polygon such as a triangle including an isosceles triangle or a right triangle, a tetragon such as a rhombus or a parallelogram, a pentagon, or a hexagon or may be an indeterminate shape. In addition, the sectional shape of the first ventilation duct line 210 may be a circle or an ellipse. In addition, the sectional shape of the first ventilation duct line 210 may change in the middle of the first ventilation duct line 210.

In addition, the case where the ventilation duct line assembly 100 is provided in the waste disposal treatment apparatus 3 has been described above by way of example. However, the destination where the ventilation duct line assembly 100 is placed is not limited particularly. The ventilation duct line assembly 100 may be directly or indirectly attached to an industrial machine, a transport machine, a general household appliance, or the like.

For example, a copier, an air blower, an air conditioner, a ventilating fan, pumps, and a power generator are exemplified as the industrial machine. In addition thereto, various manufacturing machines generating sound, such as a coater, a rotator and a carrier, etc. are exemplified as the industrial machine. For example, a car, a train, an airplane, etc. are exemplified as the transport machine. For example, a refrigerator, a washer, a drier, a television, a copier, a microwave oven, a game machine, an air conditioner, an electric fan, a PC, a cleaner, an air purifier, etc. are exemplified as the general household machine.

In addition, the second ventilation duct line 220 (the box 300) and the first ventilation duct line 210 (the tubular member 110) may be integrally molded. The second ventilation duct line 220 can be attached to or detached from the first ventilation duct line 210.

In addition, the second ventilation duct line 220 may be filled with a sound absorbing material such as glass wool.

The sound absorbing material is not limited particularly. Known sound absorbing materials can be used as the sound absorbing material. For example, materials each containing fine air and foaming materials such as urethane foam, flexible urethane foam, wood, a sintered material of ceramic particles, and phenol foam; fiber and nonwoven fabric materials such as glass wool, rock wool, microfiber (Thinsulate made by 3M etc.), a floor mat, a carpet, melt blown nonwoven fabric, metal nonwoven fabric, polyester nonwoven fabric, metal wool, felt, an insulation board and glass nonwoven fabric; a cemented excelsior board; a nano-fiber-based material such as silica nano-fiber; a plaster board; and various known sound absorbing materials can be used.

In addition, an entire face or one face of the opening portion 310 of the second ventilation duct line 220 may be covered with the sound absorbing material. For example, the opening face of the opening portion 310 of the second ventilation duct line 220 may be covered with a film having a penetrated film about several microns to several millimeters thick.

In addition, configuration may be made so that, for example, the opening face of the opening portion 310 is covered with a metal film having micro through holes each having a through hole diameter of about 0.1 to 50 μm, a thickness of 1 to 50 μm, and an aperture ratio of about 0.01 to 0.3.

The materials for forming the first ventilation duct line 210 (the tubular member 110) and the second ventilation duct line 220 (the box 300) are not limited particularly but may be selected in accordance with an environment where the first ventilation duct line 210 and the second ventilation duct line 220 are placed.

For example, metal materials such as aluminum, titanium, magnesium, tungsten, iron, steel, chromium, chrome molybdenum, nichrome molybdenum, and alloys thereof; resin materials such as acrylic resin, polymethyl methacrylate, polycarbonate, polyamideimide, polyarylate, polyetherimide, polyacetal, polyetheretherketone, polyphenylene sulfide, polysulphone, polyethylene terephthalate, polybutylene terephthalate, polyimide, and triacetylcellulose; carbon fiber reinforced plastic (CFRP), carbon fiber, glass fiber reinforced plastic (GFRP), etc. are exemplified as the material for forming each of the first ventilation duct line 210 and the second ventilation duct line 220.

In addition, a plurality of kinds of these materials may be used in combination.

In addition, the materials for forming the first ventilation duct line 210 (the tubular member 110) and the second ventilation duct line 220 (the box 300) may be the same or may be different.

When the first ventilation duct line 210 and the second ventilation duct line 220 are integrally molded, the materials for forming the first ventilation duct line 210 and the second ventilation duct line 220 are preferably the same.

Figure 15:
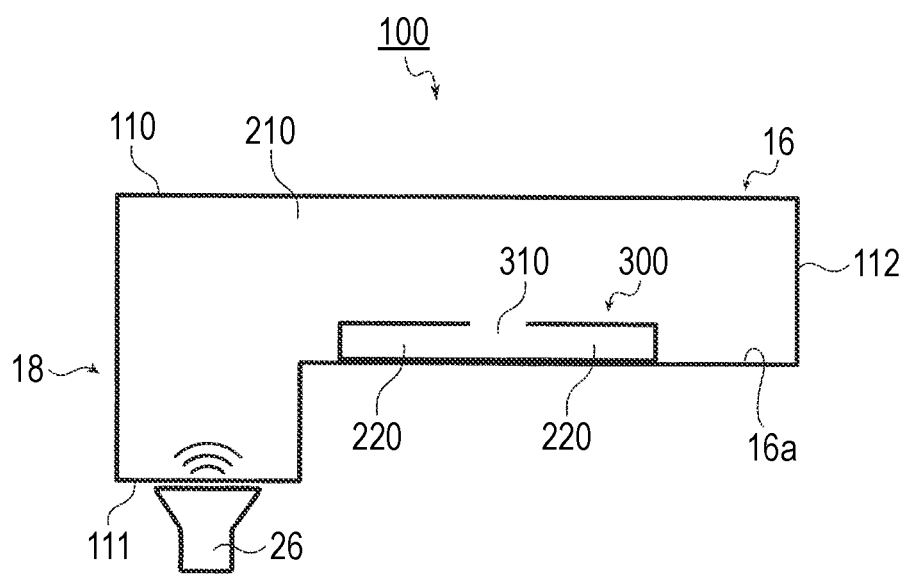
FIG. 15 is a view showing another configuration example of the ventilation duct line assembly.

In addition, the opening portion 310 of the second ventilation duct line 220 is not limited to the end portion of the second ventilation duct line 220 but may be provided in a central portion (a central portion in the direction in which the first ventilation duct line 210 extends) of the second ventilation duct line 220 (the box 300), as shown in FIG. 15 (a view showing another configuration example of the ventilation duct line assembly 100).

Figure 16:
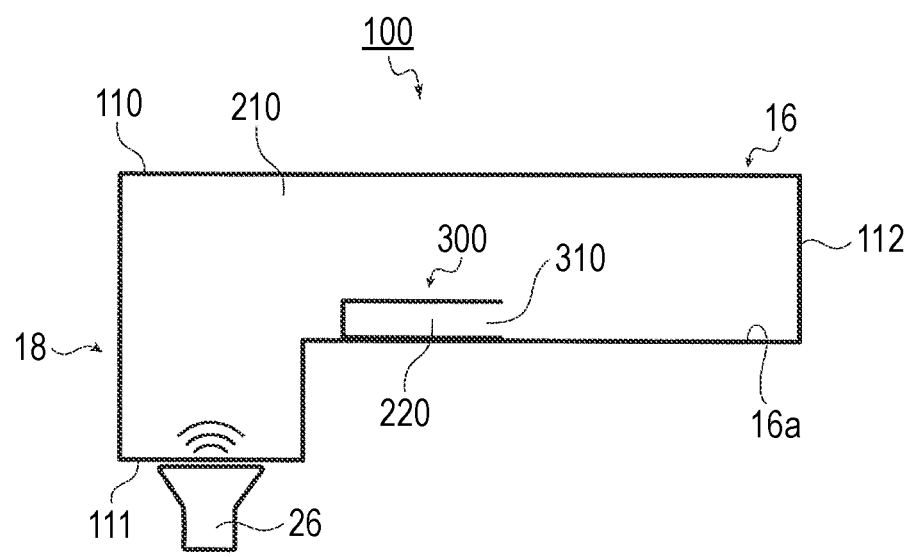
FIG. 16 is a view showing another configuration example of the ventilation duct line assembly.

In addition, the opening portion 310 of the second ventilation duct line 220 may be provided in an end portion of the second ventilation duct line 220 which is an end portion positioned on the side of the air outtake port 112 of the first ventilation duct line 210, as shown in FIG. 16 (a view showing another configuration example of the ventilation duct line assembly 100).

The ventilation duct line assembly 100 configured in the aforementioned manner attains transmission loss in a broad band by use of the resonance and the duct coupling mode together. That is, the ventilation duct line assembly 100 can widen the band of the sound deadening effect.

The structure including an air-column resonance tube such as the second ventilation duct line 220 has a configuration having the opening portion 310 and a closed space, like an air-column cylinder.

It has been generally known that the structure of such an air-column resonance tube generates an air-column resonance phenomenon. When the structure of the air-column resonance tube is placed inside the first ventilation duct line 210, as in the present embodiment, transmission loss increases at the resonance frequency.

In order to increase the transmission loss in the broad band based on the aforementioned duct coupling mode and the aforementioned resonance principle, configuration is preferably made so as to express both the air-column resonance frequency and the duct coupling mode simultaneously.

Thus, increases of at least two transmission losses based on different principles, i.e. (i) an increase of transmission loss based on the air-column resonance and (ii) an increase of transmission loss based on the duct coupling mode can be expressed. As a result, transmission loss in a broader band can be earned.

The structure according to the present embodiment can attain a non-resonance transmission loss peak based on the duct coupling mode. Particularly, when the duct coupling mode is used, the size of the structure can be made smaller than a resonator. Further, when the duct coupling mode and the resonance are used together simultaneously, as described above, transmission loss can be attained in a broader band.

Although the present invention has been described in detail and with reference to the specific embodiments, it is obvious to those skilled in the art that various changes or modifications can be made without departing from the spirit and scope of the present invention.

The present application is based on Patent Application No. 2017-198579 which is a Japanese patent application filed on Oct. 12, 2017, and the contents of which are incorporated herein by reference.

REFERENCE SIGNS LIST

3 . . . waste disposal treatment apparatus, 100 . . . ventilation duct line assembly, 111 . . . air intake port, 112 . . . air outtake port, 210 . . . first ventilation duct line, 210A . . . first portion, 210B . . . second portion, 210C . . . third portion, 220 . . . second ventilation duct line, 220A . . . bonding face, 220B . . . ventilation duct line opposing face, 300 . . . box, 310 . . . opening portion, 400 . . . porous material, M . . . motor

The invention claimed is:
1. A ventilation duct line assembly comprising:
a first ventilation duct line through which sound can pass between at least two openings, and the first ventilation duct line having a first portion having a first sectional area, a second portion having a second sectional area larger than the first sectional area, and a third portion having an inclined inner face connecting the first portion and the second portion to each other; and
a second ventilation duct line that has an opening portion positioned on an inner side of the first portion of the first ventilation duct line so that sound received from the opening portion is reflected inside the second ventilation duct line and then emitted from the opening portion, wherein the second ventilation duct line is disposed at an inner side of the first ventilation duct line.

2. The ventilation duct line assembly according to claim 1, wherein the opening portion of the second ventilation duct line is shaped to be a rectangle or an ellipse, and a longitudinal direction of the opening portion intersects with a direction in which the first ventilation duct line extends.

3. A ventilation duct line assembly comprising:
a first ventilation duct line through which sound can pass between at least two openings, the first ventilation duct line having an air intake port, an air outtake port, a first portion having a first sectional area, a second portion having a second sectional area larger than the first sectional area and being closer to the air outtake port than the first portion, and a third portion having an inclined inner face connecting the first portion and the second portion to each other; and
a second ventilation duct line that has an opening portion positioned on an inner side of the first portion of the first ventilation duct line so that sound received from the opening portion is reflected inside the second ventilation duct line and then emitted from the opening portion,
wherein a bent part is disposed between the air intake port and the first portion, of the first ventilation duct line, and the second ventilation duct line is provided at a wall portion at an inner side of the bent part of the first ventilation duct line.

4. The ventilation duct line assembly according to claim 3, further comprising an air guide member which is provided at an inner surface, between the air intake port and the first portion, of the first ventilation duct line, and which guides air from the air intake port to a position separated from the inner surface.

5. The ventilation duct line assembly according to claim 3, wherein:
the second ventilation duct line has a resonance frequency fr [Hz]; and
at a frequency fma [Hz] highest among frequencies at each of which transmission loss is minimum about a transmission loss spectrum of the first ventilation duct line and that are lower than the resonance frequency fr, the second ventilation duct line satisfies the following expression (2)

$$0 \leq La1 \leq \lambda fma/4 \quad (2)$$

where La1 designates a distance between the opening portion of the second ventilation duct line and a position of the first ventilation duct line at which sound pressure is maximum and that is nearest to the opening portion with respect to the same direction as a flowing direction of the sound at the frequency fma, and λfma designates a wavelength at the frequency fma.

6. The ventilation duct line assembly according to claim 3, wherein:
the second ventilation duct line has a resonance frequency fr [Hz]; and
at a frequency fmb [Hz] lowest among frequencies at each of which transmission loss is minimum about a transmission loss spectrum of the first ventilation duct line and that are higher than the resonance frequency fr, the second ventilation duct line satisfies the following expression (4)

$$\lambda fmb/4 \leq La2 \leq \lambda fmb/2 \quad (4)$$

where La2 designates a distance between the opening portion of the second ventilation duct line and a position of the first ventilation duct line at which sound pressure is maximum and that is nearest to the opening portion with respect to the same direction as a flowing direction of the sound at the frequency fmb, and λfmb designates a wavelength at the frequency fmb.

7. The ventilation duct line assembly according to claim 1, wherein at least a portion of an outer face of the second ventilation duct line is bonded to a portion of an inner face of the first ventilation duct line.

8. The ventilation duct line assembly according to claim 7, wherein a distance between an opposed face of the second ventilation duct line on an opposite side to the bonding face of the second ventilation duct line and an inner face of the first ventilation duct line is shorter than a longitudinal-direction length of the bonding face of the second ventilation duct line.

9. The ventilation duct line assembly according to claim 7, wherein:
the first portion of the first ventilation duct line has a width in a direction intersecting with a direction in which the first ventilation duct line extends; and
the second ventilation duct line is provided to extend from one end of the first portion to the other end of the first portion in the width direction, and in the opening portion of the second ventilation duct line, a longitudinal-direction length of the opening portion is a length which is 90% or more of a width-direction distance between the one end of the first portion and the other end of the first portion.

10. The ventilation duct line assembly according to claim 1, wherein:
a box having an opening portion is placed at an inner side of the first ventilation duct line; and
the second ventilation duct line is formed by an internal space of the box.

11. The ventilation duct line assembly according to claim 10, wherein the box is formed into a shape of a rectangular parallelepiped.

12. The ventilation duct line assembly according to claim 11, wherein the box having the shape of the rectangular parallelepiped has three pairs of outer faces which are opposed to each other; a first face of the box, which is one of one pair of the outer faces each having a largest area, of the three pairs of the outer faces, has the opening portion; and a second face of the box opposed to the first face of the box is bonded to the inner face of the first ventilation duct line.

13. The ventilation duct line assembly according to claim 1, wherein:
a portion of the inner face of the first ventilation duct line is formed to be opposed to an air intake port of the first ventilation duct line; and
an air outtake port side of the first ventilation duct line continuous to the portion of the inner face of the first ventilation duct line opposed to the air intake port is formed to be opposed to the opening portion of the second ventilation duct line.

14. The ventilation duct line assembly according to claim 1, wherein an air outtake port of the first ventilation duct line is formed to face down in a vertical direction.

15. The ventilation duct line assembly according to claim 1, wherein an area of an air outtake port belonging to the first ventilation duct line is larger than the sectional area of the first portion.

16. The ventilation duct line assembly according to claim 1, wherein the first portion of the first ventilation duct line is formed so that the first sectional area in the sectional area of the first ventilation duct line is smallest.

17. The ventilation duct line assembly according to claim 1, wherein:
the second ventilation duct line has a resonance frequency fr [Hz]; and
at a frequency fma [Hz] highest among frequencies at each of which transmission loss is minimum about a transmission loss spectrum of the first ventilation duct line and that are lower than the resonance frequency fr, the second ventilation duct line satisfies the following expression (2)

$$0 \leq La1 \leq \lambda\text{fma}/4 \quad (2)$$

where La1 designates a distance between the opening portion of the second ventilation duct line and a position of the first ventilation duct line at which sound pressure is maximum and that is nearest to the opening portion with respect to the same direction as a flowing direction of the sound at the frequency fma, and λfma designates a wavelength at the frequency fma.

18. The ventilation duct line assembly according to claim 1, wherein:
the second ventilation duct line has a resonance frequency fr [Hz]; and
at a frequency fmb [Hz] lowest among frequencies at each of which transmission loss is minimum about a transmission loss spectrum of the first ventilation duct line and that are higher than the resonance frequency fr, the second ventilation duct line satisfies the following expression (4)

$$\lambda\text{fmb}/4 \leq La2 \leq \lambda\text{fmb}/2 \quad (4)$$

where La2 designates a distance between the opening portion of the second ventilation duct line and a position of the first ventilation duct line at which sound pressure is maximum and that is nearest to the opening portion with respect to the same direction as a flowing direction of the sound at the frequency fmb, and λfmb designates a wavelength at the frequency fmb.

19. The ventilation duct line assembly according to claim 1, wherein a porous material is placed on an inner face of the second portion and/or the third portion.

20. A ventilation duct line assembly comprising:
a first ventilation duct line through which sound can pass between at least two openings, the first ventilation duct line having a first portion having a first sectional area, an outtake port that is one of the at least two openings and serves for discharging air, and whose area is larger than the first sectional area, and a second portion having an inclined inner face connecting the first portion and the outtake port to each other; and
a second ventilation duct line that has an opening portion positioned on an inner side of the first portion of the first ventilation duct line so that sound received from the opening portion is reflected inside the second ventilation duct line and then emitted from the opening portion,
wherein the second ventilation duct line is disposed at an inner side of the first ventilation duct line.

21. An apparatus comprising:
a sound source; and
a fourth partial ventilation duct line through which sound from the sound source can be passed; wherein:
the fourth partial ventilation duct line is connected to the ventilation duct line assembly according to claim 1.

* * * * *